United States Patent
Funk

(10) Patent No.: US 10,819,501 B2
(45) Date of Patent: Oct. 27, 2020

(54) VALIDATING ONE OR MORE BLOCKCHAINS WITHOUT LEDGER LIMITATIONS

(71) Applicant: CenturyLink Intellectual Property LLC, Denver, CO (US)

(72) Inventor: Tom Funk, Littleton, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 298 days.

(21) Appl. No.: 15/857,299

(22) Filed: Dec. 28, 2017

(65) Prior Publication Data

US 2018/0343110 A1 Nov. 29, 2018

Related U.S. Application Data

(60) Provisional application No. 62/510,143, filed on May 23, 2017.

(51) Int. Cl.
| | |
|---|---|
| *H04L 9/06* | (2006.01) |
| *G06F 21/62* | (2013.01) |
| *H04L 9/08* | (2006.01) |
| *H04L 9/32* | (2006.01) |

(52) U.S. Cl.
CPC ........ *H04L 9/0618* (2013.01); *G06F 21/6218* (2013.01); *H04L 9/0643* (2013.01); *H04L 9/0838* (2013.01); *H04L 9/3239* (2013.01); *H04L 2209/38* (2013.01)

(58) Field of Classification Search
CPC ... G06Q 20/065; H04L 9/3239; H04L 9/0643; H04L 9/3236; G06F 16/137

USPC ......................................................... 713/168
See application file for complete search history.

(56) References Cited

U.S. PATENT DOCUMENTS

| | | | | |
|---|---|---|---|---|
| 10,114,969 | B1* | 10/2018 | Chaney | H04L 9/3247 |
| 2017/0031676 | A1* | 2/2017 | Cecchetti | H04L 9/3236 |
| 2017/0206523 | A1* | 7/2017 | Goeringer | G06F 21/45 |
| 2017/0302663 | A1 | 10/2017 | Nainar et al. | |
| 2017/0344580 | A1* | 11/2017 | King | G06F 16/137 |

(Continued)

OTHER PUBLICATIONS

Brownworth, Anders. Blockchain Demo—Part 1, Blockchain Demo Part 2; Website: https://anders.com/blockchain/; BTC: 1K3NvcuZzVTueHW1qhkG2Cm3viRkh2EXJp ETH: 0x84a90e21d9d02e30ddcea56d618aa75ba90331ff; last accessed Mar. 28, 2018, 4 pages.

*Primary Examiner* — Bryan F Wright

(57) ABSTRACT

Novel tools and techniques are provided for implementing scaling and distribution of blockchains without ledger limitations. In various embodiments, a computing system might access many instances of a blockchain from many distributed peers. The computing system might parse a first instance of the blockchain accessible from a first distributed peer, to produce a first sample segment of a hash value of one of many blocks of the blockchain. The computing system might compare the first sample segment with a corresponding hash value portion of a second instance of the blockchain accessible from a second distributed peer, without comparing hash values of the entire first instance with those of the entire second instance. Based on a determination that the first sample segment and the corresponding hash value portion do not match, the computing system might send a notification to a user indicating that the first instance and/or second instance is invalid.

17 Claims, 9 Drawing Sheets

(56) References Cited

U.S. PATENT DOCUMENTS

| | | | |
|---|---|---|---|
| 2017/0345011 A1* | 11/2017 | Salami | G06Q 20/42 |
| 2018/0113752 A1* | 4/2018 | Derbakova | H04L 9/3239 |
| 2018/0189333 A1* | 7/2018 | Childress | H04L 9/3236 |
| 2018/0191502 A1* | 7/2018 | Karame | G06Q 20/065 |
| 2018/0227119 A1* | 8/2018 | Bibera | H04L 9/0643 |

* cited by examiner

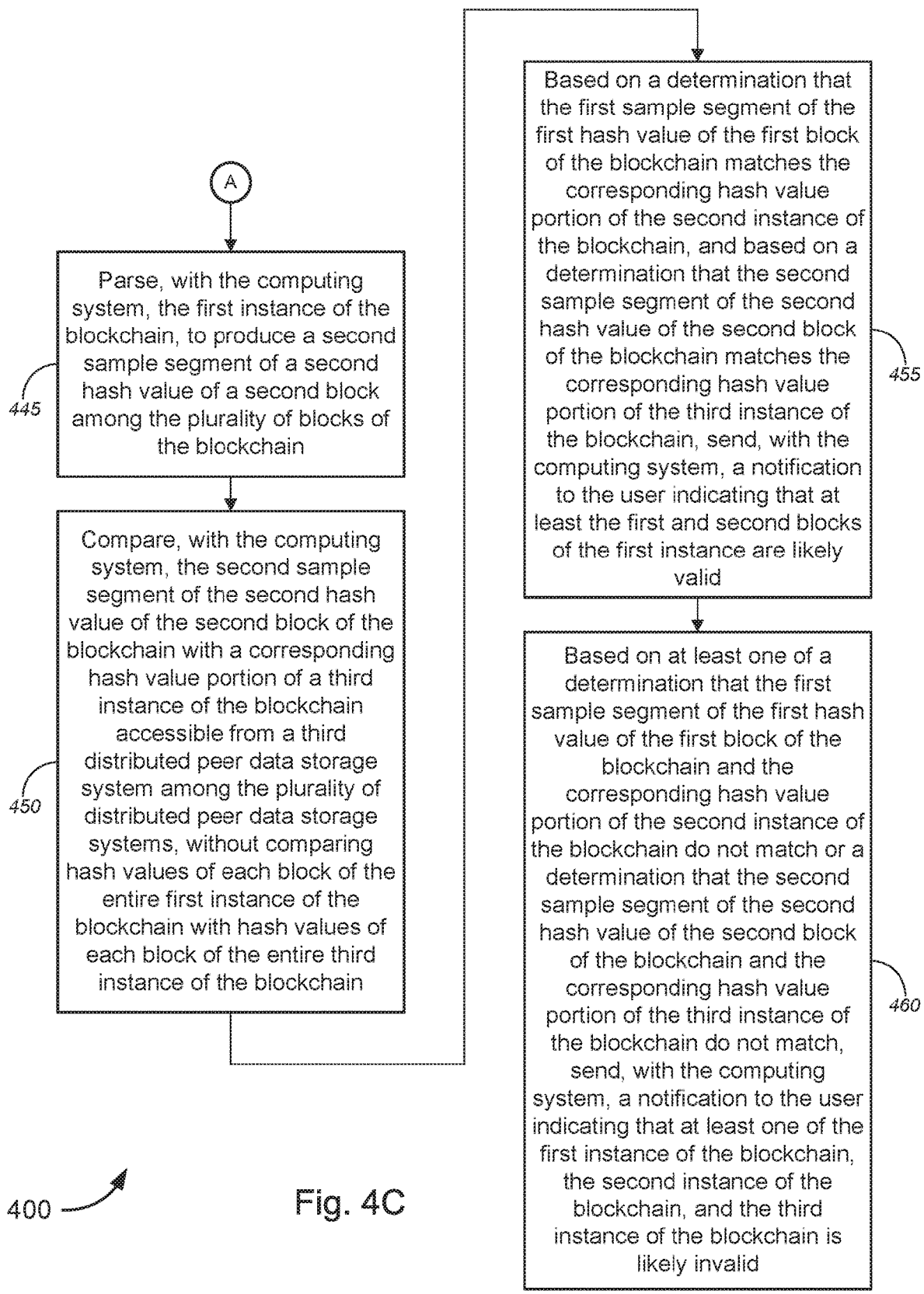

VALIDATING ONE OR MORE BLOCKCHAINS WITHOUT LEDGER LIMITATIONS

CROSS-REFERENCES TO RELATED APPLICATIONS

This application claims priority to U.S. Patent Application Ser. No. 62/510,143 (the "'143 Application"), filed May 23, 2017 by Tom Funk, entitled, "Blockchain 2.0—A Method to Scale and Distribute Blockchain Sans Ledger Limitations," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing blockchain transactions and/or verification, and, more particularly, to methods, systems, and apparatuses for implementing scaling and distribution of blockchains without ledger limitations.

BACKGROUND

A blockchain is a decentralized and distributed digital record or ledger that is used to track or record transactions (or other data) across many computers so that the record cannot be altered retroactively without notice or without alteration of all subsequent blocks and collusion by others in the network. This is accomplished by the inherent nature of the hash value of a block (and the previous hash value) changing when even one character is changed in the data portion of the block (that includes, without limitation, deleting one or more characters, adding one or more characters, changing one or more characters, and/or the like). Because each subsequent block in the blockchain relies on the previous hash value to generate a current hash value for that block, each and every block following the changed block (even if "mined" to find a nonce value that makes the hash value start with 4 zeros (i.e., "0000") and thus to generate a signed block) will be "broken," i.e., will have a previous hash value that changes, thus resulting in a hash value that does not start with 4 zeros (i.e., "0000") until mined.

Because the blockchain is widely distributed in peer storage systems, comparison of blockchains in different peers can identify instances of the blockchain that is different from other instances of the blockchain, where any change to any one character in a block will result in a change in the hash values for that block and subsequent blocks in the blockchain.

Conventional techniques for auditing or verifying instances of blockchains require comparing hash values of each block of the entire target instance of the blockchain with hash values of each block of the entirety of each of one or more other instances of the blockchain. The problem with such verification techniques is that each transaction or storage of new data results in a new block being added to the change, such that the blockchain continuously grows. The longer and longer the blockchain becomes, the more computational resources are required to verify one or more instances of the blockchain (particularly using the conventional techniques described above), which results in transactions or verifications that take longer and longer times to perform. Such ledger limitations of conventional techniques for auditing or verifying instances of blockchains may overshadow (and potentially counterbalance or reduce) the value of the security aspect of blockchains, particularly with respect to transactions like cryptocurrency, other secure record keeping, and/or the like.

SUMMARY

In various embodiments, a computing system might access many instances of a blockchain from many distributed peers. The computing system might parse a first instance of the blockchain accessible from a first distributed peer, to produce a first sample segment of a hash value of one of many blocks of the blockchain and compare the first sample segment with a corresponding hash value portion of a second instance of the blockchain accessible from a second distributed peer, without comparing hash values of the entire first instance with those of the entire second instance.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are flow diagrams illustrating a method for implementing scaling and distribution of blockchains without ledger limitations, in accordance with various embodiments.

DETAILED DESCRIPTION OF CERTAIN EMBODIMENTS

Overview

Figure 1:
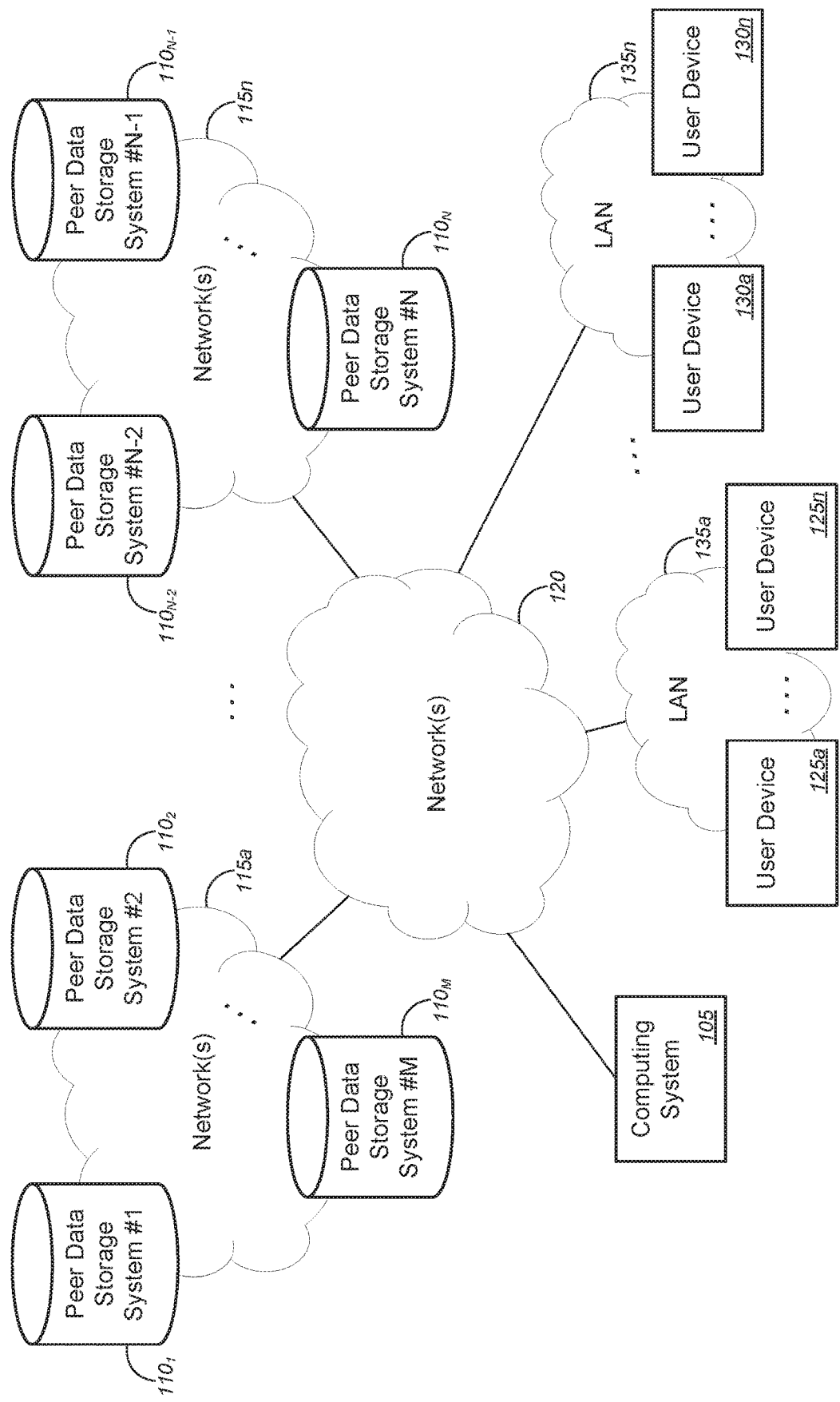
FIG. 1 is a schematic diagram illustrating a system for implementing scaling and distribution of blockchains without ledger limitations, in accordance with various embodiments.

Various embodiments provide tools and techniques for implementing blockchain transactions and/or verification, and, more particularly, to methods, systems, and apparatuses for implementing scaling and distribution of blockchains without ledger limitations.

In various embodiments, a computing system might access a plurality of instances of a blockchain each from a distributed peer data storage system among a plurality of distributed peer data storage systems disposed across one or more networks. The computing system might parse a first instance of the blockchain accessible from a first distributed peer data storage system among the plurality of distributed peer data storage systems, to produce a first sample segment of a first hash value of a first block among a plurality of blocks of the blockchain. The computing system might compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain. Based on a determination that the first sample segment of the first hash value of the first block of the blockchain and the corresponding hash value portion of the second instance of the blockchain do not match, the computing system might send a notification to a user (via a user device, or the like) indicating that at least one of the first instance of the blockchain or the second instance of the blockchain is invalid.

Comparing the same corresponding hash value portions of two instances of a particular blockchain might allow one to determine, in the case of non-matching hash values, that one or both of the instances of the blockchain are invalid. However, in and of itself, determining validity of one or both of the instances of the blockchain by comparing only two instances of the blockchain is not possible. Rather, one might compare the same corresponding hash value portions of three or more instances (ideally, many more instances) of the particular blockchain—that is, comparing hash value portions of a first (or target) instance of the blockchain with corresponding hash value portions of at least two (other) instances (in some cases, many more other instances) of the blockchain. A majority might be used to determine which instance(s) are likely valid (i.e., beyond a predetermined threshold probability value that the identified instances of the blockchain are valid). Non-limiting examples of majority determinations of validity are shown and described below with respect to FIGS. 2 and 3.

Alternative, or additional, to comparing the same corresponding hash value portions of three or more instances (ideally, many more instances) of the particular blockchain, one might compare a first sample segment of a first hash value of a first block with corresponding hash value portions of one or more other instances of the blockchain while also comparing a second sample segment of a second hash value of a second block with corresponding hash value portions of the one or more other instances of the blockchain. In other words, by spot checking multiple parts of the hash value of the instances, there is a higher probability of verifying whether or not a target instance of the blockchain is valid or invalid. Coupling that with comparing the multiple different hash value portions with corresponding hash value portions across multiple instances of the blockchain would increase the certainty or probability of the verification process.

Alternatively, one might determine whether a master instance of the blockchain is stored in at least one of the plurality of distributed peer data storage systems. Here, a master instance of a blockchain is an instance that has previously been verified in its entirety to be valid and to accurately reflect fidelity of its data contents (either because it is stored in a peer data storage system that has tracked and/or monitored additions of blocks since block #1 of the blockchain and/or because auditing the particular instance against a plurality of other instances has verified to a high probability that it is valid and accurately reflects fidelity of its data contents, or the like). If there is such a master instance, segments of the hash value of portions of a target instance of the blockchain might be compared with corresponding hash value portions of the master instance to determine validity or invalidity of at least the particular block of the target instance of the blockchain.

Merely by way of example, in some cases, the first sample segment of the first hash value of the first block might comprise the entire segment of the first hash of the first block. In some instances, the first block among the plurality of blocks of the blockchain may be selected based on selection by the user for verification of data encapsulated in the first block. For example, the user might wish to verify a transaction, whose data might be stored in block #15 of a particular blockchain having 100 blocks, or the like, and thus the first block (in this case) might be block #15 of the particular blockchain.

In some embodiments, the first sample segment of the first hash value might be selected for analysis using one or more statistical sampling techniques, including, but not limited to, one or more of simple random sampling technique, systematic sampling technique, stratified sampling technique, probability-proportional-to-size sampling technique, cluster sampling technique, quota sampling technique, minimax sampling technique, accidental sampling technique, voluntary sampling technique, line-intercept sampling technique, panel sampling technique, snowball sampling technique, or theoretical sampling technique, and/or the like.

According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

In the various embodiments, by comparing one or more hash value segments between two or more instances of the blockchain (one or more of which might be a master instance of the blockchain, in some cases), without comparing hash values of each block of the entire (target) instance of the blockchain with has values of each block of the entirety of each of the two or more instances of the blockchain, relatively high likelihood or certainty of validation or invalidation of at least the particular block of the target instance can be achieved, while reducing the computational burdens of computing systems (and thus reducing computational times) for verifying the validity or invalidity of the target instance of the blockchain, particularly as the blockchain becomes longer and longer (i.e., with more and more blocks, perhaps representing transactions or other data recordings) over time. These and other functionalities of the various embodiments are described in detail below with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, blockchain transaction technology, blockchain verification or auditing technology, and/or the like. In other aspects, certain embodiments, can improve the functioning of user equipment or systems themselves (e.g., blockchain verification or auditing computing systems or the like, etc.), for example, by parsing, with the computing system, a first instance of the blockchain accessible from a first distributed peer data storage system among the plurality of distributed peer data storage systems, to produce a first sample segment of a first hash value of a first block among the plurality of blocks of the blockchain, and comparing, with the computing system, the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain (or performing other comparisons of sample segments of the hash value of one or more blocks of the blockchain with corresponding hash value portions of other instances of the blockchain, without performing comparisons of the hash values of entire instances of the blockchain), and/or the like. In particular, to the extent any abstract concepts are present in the various embodiments, those concepts can be implemented as described herein by devices, software, systems, and methods that involve specific novel functionality (e.g., steps or operations), such as, parsing, with the computing system, a first instance of the blockchain accessible from a first distributed peer data storage system among the plurality of distributed peer data storage systems, to produce a first sample segment of a first hash value of a first block among the plurality of blocks of the blockchain, and comparing, with the computing system, the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain (or performing other comparisons of sample segments of the hash value of one or more blocks of the blockchain with corresponding hash value portions of other instances of the blockchain, without performing comparisons of the hash values of entire instances of the blockchain), and/or the like, and/or the like, to name a few examples, that extend beyond mere conventional computer processing operations. These functionalities can produce tangible results outside of the implementing computer system, including, merely by way of example, optimized blockchain verification or auditing, thus improving the speed of such verification or auditing blockchain instances (while using, e.g., statistical techniques or the like to maintain high level of confidence with respect to validity and/or invalidity determinations of particular target instances of the blockchain), and/or the like, at least some of which may be observed or measured by users and/or other entities.

In an aspect, a method might comprise accessing, with a computing system, a plurality of instances of a blockchain each from a distributed peer data storage system among a plurality of distributed peer data storage systems. The blockchain might comprise a plurality of blocks, each block comprising a hash value corresponding to encryption of both data that is encapsulated in said block and a previous hash value corresponding to encryption of data and hash value of a preceding block in the blockchain. The method might further comprise parsing, with the computing system, a first instance of the blockchain accessible from a first distributed peer data storage system among the plurality of distributed peer data storage systems, to produce a first sample segment of a first hash value of a first block among the plurality of blocks of the blockchain. The method might also comprise comparing, with the computing system, the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain. The method might further comprise, based on a determination that the first sample segment of the first hash value of the first block of the blockchain and the corresponding hash value portion of the second instance of the blockchain do not match, sending, with the computing system, a notification to a user indicating that at least one of the first instance of the blockchain or the second instance of the blockchain is invalid.

In some embodiments, comparing the first sample segment of the first hash value of the first block of the blockchain with a corresponding hash value portion of a second instance of the blockchain might comprise comparing, with the computing system, the first sample segment of the first hash value of the first block of the blockchain with a corresponding hash value portion of each of at least two instances of the plurality of instances of the blockchain accessible from corresponding distributed peer data storage systems among the plurality of distributed peer data storage systems, without comparing hash values of each block of the entire first instance of the blockchain with hash values of each block of the entirety of each of the at least two instances of the blockchain. In such embodiments, the method might further comprise analyzing, with the computing system, the first sample segment of the first hash value of the first block and the corresponding hash value portion of each of the at least two instances to determine a likely valid sample segment of the first hash value of the first block among the first instance and the at least two instances. The method might comprise, based on a determination that the first sample segment of the first hash value of the first block of the blockchain contains the likely valid sample segment of the first hash value of the first block, sending, with the computing system, a notification to the user indicating that at least the first block of the first instance is likely valid. Alternatively, or additionally, the method might comprise, based on a determination that the first sample segment of the first hash value of the first block of the blockchain does not contain the likely valid sample segment of the first hash value of the first block, sending, with the computing system, a notification to the user indicating that the first instance is likely invalid.

Alternatively, or additionally, the method might further comprise parsing, with the computing system, the first instance of the blockchain, to produce a second sample segment of a second hash value of a second block among the plurality of blocks of the blockchain; and comparing, with the computing system, the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain. The method might comprise, based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, sending, with the computing system, a notification to the user indicating that at least the first block and the second block of the first instance are likely valid. Alternatively, or additionally, the method might comprise, based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, sending, with the computing system, a notification to the user indicating that at least one of the first instance of the blockchain, the second instance of the blockchain, and the third instance of the blockchain is likely invalid. In some cases, at least one of the first sample segment of the first hash of the first block of the blockchain or the second sample segment of the second hash of the second block of the blockchain may be selected in a randomized manner.

Alternatively, or additionally, the plurality of instances of the blockchain might comprise at least one master instance of the blockchain each accessible from one of the plurality of distributed peer data storage systems, and comparing the first sample segment of the first hash value of the first block of the blockchain with a corresponding hash value portion of a second instance of the blockchain might comprise comparing, with the computing system, the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain. In such embodiments, the method might further comprise, based on a determination that the first sample segment of the first hash value of the first block of the blockchain matches the corresponding hash value portion of the at least one master instance of the blockchain, sending, with the computing system, a notification to the user indicating that at least the first block of the first instance is valid. Alternatively, or additionally, the method might comprise, based on a determination that the first sample segment of the first hash value of the first block of the blockchain and the corresponding hash value portion of the at least one master instance of the blockchain do not match, sending, with the computing system, a notification to the user indicating that the first instance of the blockchain is invalid.

In some embodiments, the first sample segment of the first hash value of the first block might comprise the entire segment of the first hash of the first block. In some instances, the first block among the plurality of blocks of the blockchain may be selected based on selection by the user for verification of data encapsulated in the first block. In some cases, the first sample segment of the first hash value might be selected for analysis using one or more statistical sampling techniques. Merely by way of example, according to some embodiments, data of a block and hash value of a previous block in the blockchain might be encrypted to produce a hash value, using a cryptographic hash function comprising one of secure hash algorithm-1 ("SHA-1") standard, SHA-2 standard, or SHA-3 standard, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: access a plurality of instances of a blockchain each from a distributed peer data storage system among a plurality of distributed peer data storage systems, the blockchain comprising a plurality of blocks, each block comprising a hash value corresponding to encryption of both data that is encapsulated in said block and a previous hash value corresponding to encryption of data and hash value of a preceding block in the blockchain; parse a first instance of the blockchain accessible from a first distributed peer data storage system among the plurality of distributed peer data storage systems, to produce a first sample segment of a first hash value of a first block among the plurality of blocks of the blockchain; compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain; and based on a determination that the first sample segment of the first hash value of the first block of the blockchain and the corresponding hash value portion of the second instance of the blockchain do not match, send a notification to a user indicating that at least one of the first instance of the blockchain or the second instance of the blockchain is invalid.

According to some embodiments, comparing the first sample segment of the first hash value of the first block of the blockchain with a corresponding hash value portion of a second instance of the blockchain might comprise comparing the first sample segment of the first hash value of the first block of the blockchain with a corresponding hash value portion of each of at least two instances of the plurality of instances of the blockchain accessible from corresponding distributed peer data storage systems among the plurality of distributed peer data storage systems, without comparing hash values of each block of the entire first instance of the blockchain with hash values of each block of the entirety of each of the at least two instances of the blockchain. In such embodiments, the set of instructions, when executed by the at least one processor, might further cause the apparatus to: analyze the first sample segment of the first hash value of the first block and the corresponding hash value portion of each of the at least two instances to determine a likely valid sample segment of the first hash value of the first block among the first instance and the at least two instances; based on a determination that the first sample segment of the first hash value of the first block of the blockchain contains the likely valid sample segment of the first hash value of the first block, send a notification to the user indicating that at least the first block of the first instance is likely valid; and based on a determination that the first sample segment of the first hash value of the first block of the blockchain does not contain the likely valid sample segment of the first hash value of the first block, send a notification to the user indicating that the first instance is likely invalid.

Alternatively, or additionally, the set of instructions, when executed by the at least one processor, might further cause the apparatus to: parse the first instance of the blockchain to produce a second sample segment of a second hash value of a second block among the plurality of blocks of the blockchain; compare the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain; based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, send a notification to the user indicating that at least the first block and the second block of the first instance are likely valid; and based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, send a notification to the user indicating that at least one of the first instance of the blockchain, the second instance of the blockchain, and the third instance of the blockchain is likely invalid. In some cases, at least one of the first sample segment of the first hash of the first block of the blockchain or the second sample segment of the second hash of the second block of the blockchain may be selected in a randomized manner.

Alternatively, or additionally, the plurality of instances of the blockchain comprises at least one master instance of the blockchain each accessible from one of the plurality of distributed peer data storage systems, and comparing the first sample segment of the first hash value of the first block of the blockchain with a corresponding hash value portion of a second instance of the blockchain might comprise comparing the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain. In such embodiments, the set of instructions, when executed by the at least one processor, might further cause the apparatus to: based on a determination that the first sample segment of the first hash value of the first block of the blockchain matches the corresponding hash value portion of the at least one master instance of the blockchain, send a notification to the user indicating that at least the first block of the first instance is valid; and based on a determination that the first sample segment of the first hash value of the first block of the blockchain and the corresponding hash value portion of the at least one master instance of the blockchain do not match, send a notification to the user indicating that the first instance of the blockchain is invalid.

In some embodiments, the first sample segment of the first hash value of the first block might comprise the entire segment of the first hash of the first block. In some instances, the first block among the plurality of blocks of the blockchain may be selected based on selection by the user for verification of data encapsulated in the first block. In some cases, the first sample segment of the first hash value might be selected for analysis using one or more statistical sampling techniques.

In yet another aspect, a system might comprise a plurality of distributed peer data storage systems, a computing system, and a user device associated with a user. Each distributed peer data storage system of the plurality of distributed peer data storage systems might store an instance of a blockchain among a plurality of instances of the blockchain. The blockchain might comprise a plurality of blocks, each block comprising a hash value corresponding to encryption of both data that is encapsulated in said block and a previous hash value corresponding to encryption of data and hash value of a preceding block in the blockchain. A computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: access the plurality of instances of the blockchain each from a distributed peer data storage system among the plurality of distributed peer data storage systems; parse a first instance of the blockchain accessible from a first distributed peer data storage system among the plurality of distributed peer data storage systems, to produce a first sample segment of a first hash value of a first block among the plurality of blocks of the blockchain; compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain; and based on a determination that the first sample segment of the first hash value of the first block of the blockchain and the corresponding hash value portion of the second instance of the blockchain do not match, send a notification to a user device associated with a user indicating that at least one of the first instance of the blockchain or the second instance of the blockchain is invalid.

The user device associated with the user might comprise a display device, at least one second processor, and a second non-transitory computer readable medium communicatively coupled to the at least one second processor. The second non-transitory computer readable medium might have stored thereon computer software comprising a second set of instructions that, when executed by the at least one second processor, causes the user device to: receive the notification indicating that the at least one of the first instance of the blockchain or the second instance of the blockchain is invalid; and display, on the display device, the received notification.

In some embodiments, the user device might comprise one of a laptop computer, a tablet computer, a smart phone, a mobile phone, a personal digital assistant, or a portable gaming device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-6 illustrate some of the features of the method, system, and apparatus for implementing blockchain transactions and/or verification, and, more particularly, to methods, systems, and apparatuses for implementing scaling and distribution of blockchains without ledger limitations, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing scaling and distribution of blockchains without ledger limitations, in accordance with various embodiments.

In the non-limiting embodiment of FIG. 1, system 100 might comprise a computing system 105, which might include, without limitation, one of a processor on a user device, a server computer, a cloud-based computing system, a distributed computing system, and/or the like. System 100 might further comprise a plurality of peer data storage systems 110 distributed across a plurality of networks 115. As shown in FIG. 1, for example, distributed peer data storage systems #1 $110_1$, #2 $110_2$, through # M $110_M$ might be disposed in one or more networks 115a, while distributed peer data storage systems # N-2 $110_{N-2}$, # N-1 $110_{N-1}$, through # N $110_N$ might be disposed in one or more networks 115n. Although not shown, distributed peer data storage systems # M through # N-2 might be disposed in any of networks 115b through 115n-1. In some cases, each distributed peer storage system 110 might comprise a database, and in some cases, a local server or computing system that accesses the database in response to requests from external or remote computing systems (e.g., computing system 105, user devices, or the like). In some embodiments, computing system 105 might communicatively couple with one or more of the distributed peer data storage systems 110 in networks 115 via one or more networks 120. System 100 might further comprise one or more user devices 125a-125n and 130a-130n (collectively, "user devices," "user devices 125," or "user devices 130," or the like) disposed in one or more local area networks ("LANs") 135a-135n (collectively, "LANs 135" or the like).

According to some embodiments, networks 115a-115n and 120 might each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In operation, the computing system 105 might access a plurality of instances of a blockchain, each instance of the blockchain being accessed from a distributed peer data storage system 110 among a plurality of distributed peer data storage systems $110_1$-$110_N$. The blockchain might comprise a plurality of blocks, each block comprising a hash value corresponding to encryption of both data that is encapsulated in said block and a previous hash value corresponding to encryption of data and hash value of a preceding block in the blockchain. Non-limiting examples of a blockchain (illustrating the hash values and such) can be seen in the embodiments of FIGS. 2 and 3, which are described below.

The computing system 105 might parse a first instance of the blockchain accessible from a first distributed peer data storage system (i.e., one of the distributed peer data storage systems #1-# N $110_1$-$110_N$, or the like) among the plurality of distributed peer data storage systems $110_1$-$110_N$, to produce a first sample segment of a first hash value of a first block among the plurality of blocks of the blockchain. Herein, "the first instance of the blockchain" might refer to an instance of the blockchain being verified or audited (i.e., a "target" instance of the blockchain), to be verified against other instances of the blockchain. As shown and described below with respect to FIGS. 2 and 3, the term "first block" herein refers to a first among many blocks that are analyzed or audited among the plurality of blocks of a particular blockchain, but does not refer to the very first block of that blockchain. For example, the user might wish to verify a transaction, whose data might be stored in block #3 of a particular blockchain having 10 blocks, or the like, and thus the first block (in this case) might be block #3 of the particular blockchain (and not block #1). For ease and clarity of description, notations referring to sequential positioning within a list of peer data storage systems and/or blocks of a blockchain are denoted, e.g., "Peer #1," "Peer #2," and so on, or "Block #1" or "Block 1," "Block #2" or "Block 2," and so on.

The computing system 105 might subsequently compare the first sample segment of the first hash value of the first block of the blockchain with a corresponding hash value portion of a second instance of the blockchain accessible from a second distributed peer data storage system (i.e., another one of the distributed peer data storage systems #1-#N $110_1$-$110_N$, or the like) among the plurality of distributed peer data storage systems $110_1$-$110_N$, without comparing hash values of each block of the entire first instance of the blockchain with hash values of each block of the entire second instance of the blockchain. Based on a determination that the first sample segment of the first hash value of the first block of the blockchain and the corresponding hash value portion of the second instance of the blockchain do not match, the computing system 105 might determine that at least one of the first instance of the blockchain or the second instance of the blockchain is invalid, and might send a notification to a user (via at least one of the user devices 125 or 130 via LAN(s) 135 and network(s) 120, or the like)) indicating that at least one of the first instance of the blockchain or the second instance of the blockchain is invalid.

Comparing the same corresponding hash value portions of two instances of a particular blockchain might allow one to determine, in the case of non-matching hash values, that one or both of the instances of the blockchain are invalid. However, in and of itself, determining validity of one or both of the instances of the blockchain by comparing only two instances of the blockchain is not possible. Rather, one might compare the same corresponding hash value portions of three or more instances (ideally, many more instances) of the particular blockchain—that is, comparing hash value portions of a first (or target) instance of the blockchain with corresponding hash value portions of at least two (other) instances (in some cases, many more other instances) of the blockchain. A majority might be used to determine which instance(s) are likely valid (i.e., beyond a predetermined threshold probability value that the identified instances of the blockchain are valid). Non-limiting examples of majority determinations of validity are shown and described below with respect to FIGS. 2 and 3.

An example of such comparisons might be as follows. The computing system 105 might access a plurality of instances of a blockchain, each instance of the blockchain being accessed from a distributed peer data storage system 110 among a plurality of distributed peer data storage systems $110_1$-$110_N$, and might parse a first instance of the blockchain accessible from a first distributed peer data storage system (i.e., one of the distributed peer data storage systems #1-#N $110_1$-$110_N$, or the like) among the plurality of distributed peer data storage systems $110_1$-$110_N$, to produce a first sample segment of a first hash value of a first block among the plurality of blocks of the blockchain, as described above. Thereafter, the computing system 105 might compare the first sample segment of the first hash value of the first block of the blockchain with a corresponding hash value portion of each of at least two instances (ideally, many more instances) of the plurality of instances of the blockchain accessible from corresponding distributed peer data storage systems among the plurality of distributed peer data storage systems $110_1$-$110_N$, without comparing hash values of each block of the entire first instance of the blockchain with hash values of each block of the entirety of each of the at least two instances of the blockchain. The computing system 105 might then analyze the first sample segment of the first hash value of the first block and the corresponding hash value portion of each of the at least two instances to determine a likely valid sample segment of the first hash value of the first block among the first instance and the at least two instances (e.g., by identifying a majority consensus (if any) with respect to the sample segment of the first hash value of the first block from the compared instances of the blockchain, or the like). Based on a determination that the first sample segment of the first hash value of the first block of the blockchain contains the likely valid sample segment of the first hash value of the first block, the computing system 105 might send a notification to the user (via at least one of the user devices 125 or 130 via LAN(s) 135 and network(s) 120, or the like)) indicating that at least the first block of the first instance is likely valid (i.e., beyond a predetermined threshold probability value that the first instance of the blockchain is valid). Alternatively, based on a determination that the first sample segment of the first hash value of the first block of the blockchain does not contain the likely valid sample segment of the first hash value of the first block, the computing system 105 might send a notification to the user (via at least one of the user devices 125 or 130 via LAN(s) 135 and network(s) 120, or the like)) indicating that the first instance is likely invalid (i.e., beyond a predetermined threshold probability value that the first instance of the blockchain is invalid).

Alternative, or additional, to comparing the same corresponding hash value portions of three or more instances (ideally, many more instances) of the particular blockchain, one might compare a first sample segment of a first hash value of a first block with corresponding hash value portions of one or more other instances of the blockchain while also comparing a second sample segment of a second hash value of a second block with corresponding hash value portions of the one or more other instances of the blockchain. In other words, by spot checking multiple parts of the hash value of the instances, there is a higher probability of verifying whether or not a target instance of the blockchain is valid or invalid. Coupling that with comparing the multiple different hash value portions with corresponding hash value portions across multiple instances of the blockchain would increase the certainty or probability of the verification process.

An example of such comparisons might be as follows. The computing system 105 might access a plurality of instances of a blockchain, each instance of the blockchain being accessed from a distributed peer data storage system 110 among a plurality of distributed peer data storage systems $110_1$-$110_N$, might parse a first instance of the blockchain accessible from a first distributed peer data storage system (i.e., one of the distributed peer data storage systems #1-#N $110_1$-$110_N$, or the like) among the plurality of distributed peer data storage systems $110_1$-$10_N$, to produce a first sample segment of a first hash value of a first block among the plurality of blocks of the blockchain, and might compare the first sample segment of the first hash value of the first block of the blockchain with a corresponding hash value portion of each of at least two instances (ideally, many more instances) of the plurality of instances of the blockchain accessible from corresponding distributed peer data storage systems among the plurality of distributed peer data storage systems $110_1$-$10_N$, without comparing hash values of each block of the entire first instance of the blockchain with hash values of each block of the entirety of each of the at least two instances of the blockchain, as described above. The computing system 105 might subsequently parse the first instance of the blockchain, to produce a second sample segment of a second hash value of a second block among the plurality of blocks of the blockchain, and might compare the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain.

Based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, the computing system 105 might determine that at least the first block of the first instance is likely valid (i.e., beyond a predetermined threshold probability value that the first instance of the blockchain is valid), and might send a notification to the user (via at least one of the user devices 125 or 130 via LAN(s) 135 and network(s) 120, or the like)) indicating that at least the first block of the first instance is likely valid. Alternatively, based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, the computing system 105 might determine that at least one of the first instance of the blockchain, the second instance of the blockchain, and the third instance of the blockchain is likely invalid (i.e., beyond a predetermined threshold probability value that the at least one of the first instance of the blockchain, the second instance of the blockchain, and the third instance of the blockchain is invalid), and might send a notification to the user (via at least one of the user devices 125 or 130 via LAN(s) 135 and network(s) 120, or the like)) indicating that the at least one of the first instance of the blockchain, the second instance of the blockchain, and the third instance of the blockchain is likely invalid.

Alternatively, one might determine whether a master instance of the blockchain is stored in at least one of the distributed peer data storage systems 110. Here, a master instance of a blockchain is an instance that has previously been verified in its entirety to be valid and to accurately reflect fidelity of its data contents (either because it is stored in a peer data storage system that has tracked and/or monitored additions of blocks since block #1 of the blockchain and/or because auditing the particular instance against a plurality of other instances has verified to a high probability that it is valid and accurately reflects fidelity of its data contents, or the like). If there is such a master instance, segments of the hash value of portions of a target instance of the blockchain might be compared with corresponding hash value portions of the master instance to determine validity or invalidity of at least the particular block of the target instance of the blockchain.

An example of such comparisons might be as follows. The computing system 105 might access a plurality of instances of a blockchain, each instance of the blockchain being accessed from a distributed peer data storage system 110 among a plurality of distributed peer data storage systems $110_1$-$110_N$, and might parse a first instance of the blockchain accessible from a first distributed peer data storage system (i.e., one of the distributed peer data storage systems #1-# N $110_1$-$110_N$, or the like) among the plurality of distributed peer data storage systems $110_1$-$110_N$, to produce a first sample segment of a first hash value of a first block among the plurality of blocks of the blockchain, as described above. The computing system 105 might subsequently compare the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain.

Based on a determination that the first sample segment of the first hash value of the first block of the blockchain matches the corresponding hash value portion of the at least one master instance of the blockchain, the computing system 105 might determine that at least the first block of the first instance is valid, and might send a notification to the user (via at least one of the user devices 125 or 130 via LAN(s) 135 and network(s) 120, or the like)) indicating that at least the first block of the first instance is valid. Alternatively, based on a determination that the first sample segment of the first hash value of the first block of the blockchain and the corresponding hash value portion of the at least one master instance of the blockchain do not match, the computing system 105 might determine that the first instance is invalid, and might send a notification to the user (via at least one of the user devices 125 or 130 via LAN(s) 135 and network(s) 120, or the like)) indicating that the first instance of the blockchain is invalid.

Merely by way of example, in some cases, the first sample segment of the first hash value of the first block might comprise the entire segment of the first hash of the first block. In some instances, the first block among the plurality of blocks of the blockchain may be selected based on selection by the user for verification of data encapsulated in the first block. For example, the user might wish to verify a transaction, whose data might be stored in block #15 of a particular blockchain having 100 blocks, or the like, and thus the first block (in this case) might be block #15 of the particular blockchain.

In some embodiments, the first sample segment of the first hash value might be selected for analysis using one or more statistical sampling techniques, including, but not limited to, one or more of simple random sampling technique, systematic sampling technique, stratified sampling technique, probability-proportional-to-size sampling technique, cluster sampling technique, quota sampling technique, minimax sampling technique, accidental sampling technique, voluntary sampling technique, line-intercept sampling technique, panel sampling technique, snowball sampling technique, or theoretical sampling technique, and/or the like.

According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

Merely by way of example, data that may be encapsulated in a block of a blockchain might include, without limitation, data pertaining to at least one of currency, private equities, public equities, bonds, derivatives (e.g., futures, forwards, swaps, options, and/or more complex variations, etc.), voting rights associated with any of these, commodities, spending records, trading records, mortgage or loan records, servicing records, crowd-funding records, micro-finance records, micro-charity records, and/or the like, making such a blockchain suitable for financial instruments, records, and/or models, or the like. In some cases, other data that may be encapsulated in a block of a blockchain might include, without limitation, data pertaining to at least one of land titles, vehicle registrations, business licenses, business incorporation/dissolution records, business ownership records, regulatory records, criminal records, passports, birth certificates, death certificates, voter identification records, voting records, health and/or safety inspection records, building permits, gun permits, forensic evidence, court records, non-profit records, government records, non-profit accounting/transparency records, and/or the like, making such a blockchain suitable for public records, or the like. In some embodiments, other data that may be encapsulated in a block of a blockchain might include, without limitation, data pertaining to at least one of private transaction records, contracts, signatures, wills, trusts, escrows, personal GPS trails, and/or the like, making such a blockchain suitable for private records, or the like. In some instances, other data that may be encapsulated in a block of a blockchain might include, without limitation, data pertaining to at least one of university/college degrees, certifications, learning outcomes, grades, human resources records (e.g., salary, performance reviews, accomplishments, etc.), medical records, accounting records, business transaction records, genome data, institutional GPS trails, delivery records, arbitration records, betting records, fantasy sports records, and/or the like, making such a blockchain suitable for other semi-public records, or the like.

According to some embodiments, other data that may be encapsulated in a block of a blockchain might include, without limitation, data pertaining to at least one of home or apartment digital access keys, vacation home or timeshare digital access keys, hotel room digital access keys, digital car keys, digital rental car keys, digital leased car keys, digital locker keys, safety deposit box digital access keys, package delivery drop box digital access keys (which might be a split key between a delivery firm and the recipient, or the like), and/or the like, making such a blockchain suitable for physical asset electronic or digital access keys, or the like. In some cases, other data that may be encapsulated in a block of a blockchain might include, without limitation, data pertaining to at least one of coupons, vouchers, reservations (e.g., for restaurants, hotels, queues, etc.), movie tickets, patents, citizenship/permanent resident/VISA statuses, copyrights, trademarks, software licenses, videogame licenses, music/movie/book licenses (e.g., DRM, or the like), domain names, online identities, proof of authorship or ownership, and/or the like, making such a blockchain suitable for certain intangible records, or the like. In some instances, other data that may be encapsulated in a block of a blockchain might include, without limitation, data pertaining to at least one of documentary records (e.g., photographs, audio, video, etc.), data records (e.g., sports scores, temperature, humidity, precipitation, etc.), sim cards, GPS network identities, gun unlock codes, weapons unlock codes, nuclear launch codes, spam control (e.g., micropayments for posting spam in violation of anti-spam preferences, etc.), and/or the like, making such a blockchain suitable for other records, or the like.

In the various embodiments, by comparing one or more hash value segments between two or more instances of the blockchain (one or more of which might be a master instance of the blockchain, in some cases), without comparing hash values of each block of the entire (target) instance of the blockchain with has values of each block of the entirety of each of the two or more instances of the blockchain, relatively high likelihood or certainty of validation or invalidation of the target instance can be achieved, while reducing the computational burdens of computing systems (and thus reducing computational times) for verifying the validity or invalidity of the target instance of the blockchain, particularly as the blockchain becomes longer and longer (i.e., with more and more blocks, perhaps representing transactions or other data recordings) over time.

These and other functionalities of the various embodiments are described in detail below with respect to FIGS. 2-4.

Figure 2:
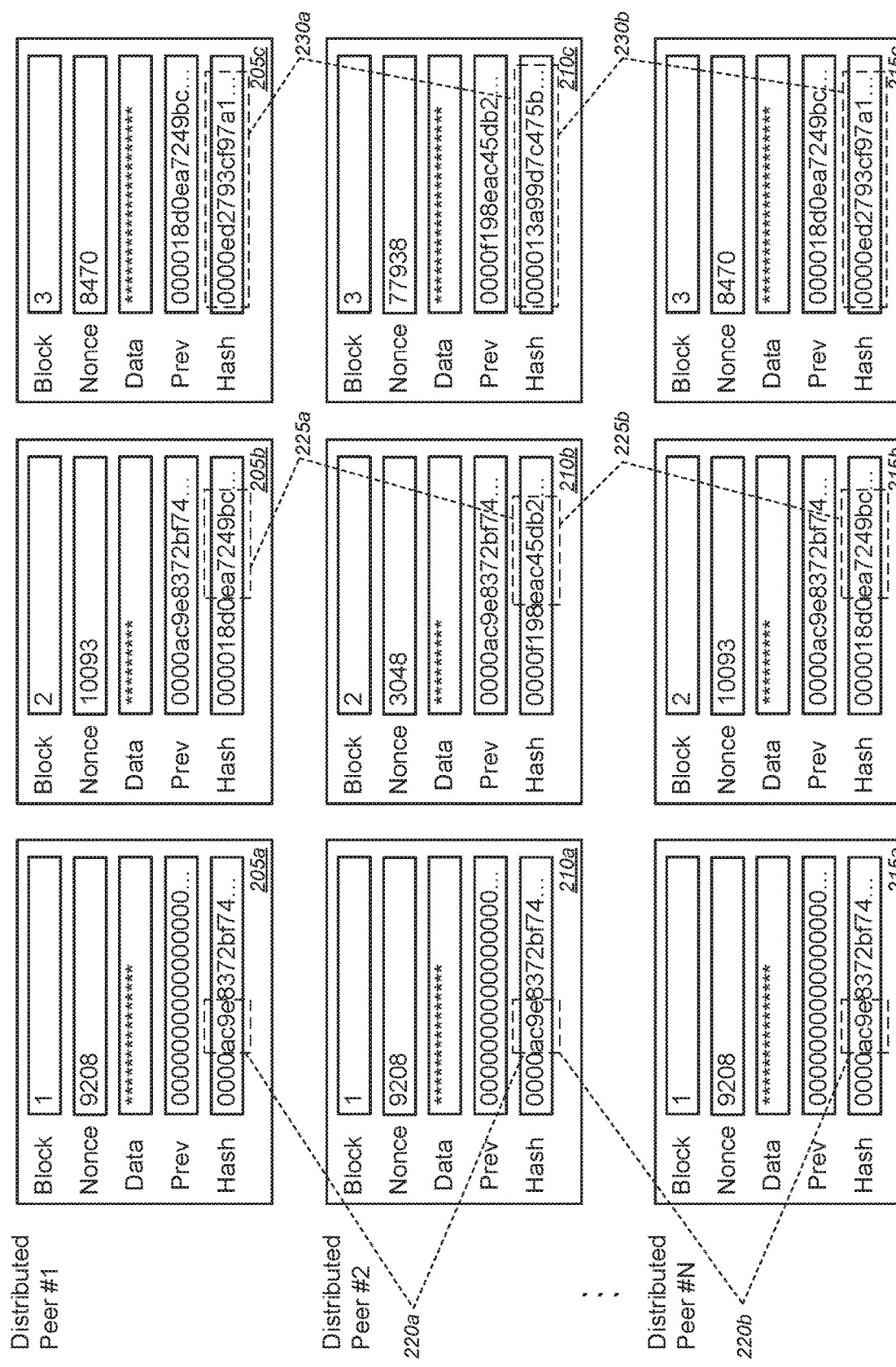
FIG. 2 is a schematic diagram illustrating an embodiment of a plurality of distributed peer data storage systems having instances of blockchains that may be verified without ledger limitations.

FIG. 2 is a schematic diagram illustrating an embodiment 200 of a plurality of distributed peer data storage systems having instances of blockchains that may be verified without ledger limitations.

As described above, a blockchain is a decentralized and distributed digital record or ledger that is used to track or record transactions (or other data) across many computers so that the record cannot be altered retroactively without notice or without alteration of all subsequent blocks and collusion by others in the network. This is accomplished by the inherent nature of the hash value of a block (and the previous hash value) changing when even one character is changed in the data portion of the block (that includes, without limitation, deleting one or more characters, adding one or more characters, changing one or more characters, and/or the like). Because each subsequent block in the blockchain relies on the previous hash value to generate a current hash value for that block, each and every block following the changed block (even if "mined" to find a nonce value that makes the hash value start with 4 zeros (i.e., "0000") and thus to generate a signed block) will be "broken," i.e., will have a previous hash value that changes, thus resulting in a hash value that does not start with 4 zeros (i.e., "0000") until mined.

With reference to FIG. 2, the embodiment 200 might comprise a plurality of instances of a blockchain that may be stored in a plurality of distributed peers or distributed peer data storage systems (i.e., Distributed Peer #1, #2, through # N, or the like; similar to distributed peer data storage systems 110 of system 100 of FIG. 1, or the like). In embodiment 200, each instance of the blockchain might comprise 3 blocks (although the number of blocks is merely illustrative and not intended to limit the invention to a blockchain of only three blocks, and can be applicable to blockchains of any number of blocks, from dozens, to scores, to hundreds, to thousands, or more, etc.), each block comprising its block number (in this example, #1, #2, or #3, or the like), a nonce value (which is a value used to offset the hash value so that the first four characters of the hash value are each "0"), the data being encapsulated or stored in the particular block (with examples of such data provided below), the hash value of the preceding block (with block #1 have a previous hash value of "0000000000000000 . . . "; also referred to as the "previous hash value" or the like), and the hash value of the current block (which is a hash of the data encapsulated in the block and the previous hash value). As described above, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

In the non-limiting embodiment of FIG. 2, three instances of a blockchain are shown, the blockchain having 3 blocks (for purposes of providing simplicity of illustration, as described above). The instance of the blockchain that is stored in Distributed Peer #1 might comprise in Block #1 205a, data of a first length (containing any suitable combination of characters, numbers, symbols, and/or the like; the types of data that may be stored or encapsulated in a block of a blockchain being listed below), a previous hash value equivalent to zero (as block #1 is the start of the blockchain and there is no preceding block in the blockchain, and thus no hash value for the non-existent previous block), and a hash value (which corresponds to a hash value of the data encapsulated in Block #1 and the previous hash value equivalent to zero). Also comprised in Block #1 might be a nonce value, which (as described above) is an offset value that is applied to the hash value to make the hash value begin with four zeros (i.e., "0000") which is the format for denoting a hash value for each signed block in a validated blockchain. Block #2 205b might likewise comprise data of a second length (also containing any suitable combination of characters, numbers, symbols, and/or the like; the types of data that may be stored or encapsulated in a block of a blockchain being listed below), a previous hash value equivalent to the hash value of Block #1, a hash value (which corresponds to a hash value of the data encapsulated in Block #2 and the previous hash value equivalent to the hash value of Block #1), and a nonce value. Similarly, Block #3 205c might comprise data of a third length (also containing any suitable combination of characters, numbers, symbols, and/or the like; the types of data that may be stored or encapsulated in a block of a blockchain being listed below), a previous hash value equivalent to the hash value of Block #2, a hash value (which corresponds to a hash value of the data encapsulated in Block #3 and the previous hash value equivalent to the hash value of Block #2), and a nonce value. The instances of the blockchain that are stored in Distributed Peer #2 and # N might have similar structure or format.

For purposes of illustration, the instances of the blockchain as stored in Distributed Peer #1 and # N might be identical, while a change (whether addition, deletion, or modification of at least one character in the data field of Block 2 210b of the instance) of the blockchain as stored in Distributed Peer #2 might be made, which would result in the hash value of Block 2 210b being automatically (and inherently) changed, requiring a different nonce value (in this example, "3048") compared with the nonce value (in this example, "10093") of Block 2 205b or 215b of the instances of the blockchain as stored in Distributed Peer #1 and # N, in order to validate Block 2 210b (by mining or the like). As further illustrated in FIG. 2, the change in Block 2 210b would result in a change in the previous hash value of Block 3 210c, which results in a different nonce value (in this example, "77938") compared with the nonce value (in this example, "8470") of Block 3 205c or 215c of the instances of the blockchain as stored in Distributed Peer #1 and # N, in order to validate Block 3 210c (by mining or the like).

Taking the instance of the blockchain as stored in Distributed Peer #2 as the first instance (or target instance), a computing system might parse the first instance to produce a first sample segment (in this example, "ac9e") of a first hash value (in this case, "0000ac9e8372bf74 . . . ") of a first block (which is actually Block 1 210a in this particular instance; although it could be Block 2 210b or Block 3 210c). The computing system might then compare the first sample segment with a corresponding hash value portion of a second instance (e.g., the instance as stored in Distributed Peer #1) and/or a third instance (e.g., the instance as stored in Distributed Peer # N), and so on, without comparing hash values of each block of the entire first instance of the blockchain with hash values of each block of the entirety of the second instance and/or the third instance (and so on). In this example, such comparison (as denoted in FIG. 2 by reference numerals 220a and 220b) might reveal that the first sample segment matches the corresponding hash value portions of each of the second instance and the third instance (namely, "ac9e"). It can thus be inferred that at least Block 1 210a has a relatively high probability of not being invalid or changed compared with Block 1 205a of the second instance and Block 1 215a of the third instance.

Alternatively, or additionally, the computing system might parse the first instance to produce a second sample segment (in this example, "eac45db2") of a second hash value (in this case, "0000f198eac45db2 . . . ") of a second block (which is actually Block 2 210b in this particular instance, although it could be Block 1 210a or Block 3 210c). The computing system might then compare the second sample segment with a corresponding hash value portion of the second instance (e.g., the instance as stored in Distributed Peer #1) and/or the third instance (e.g., the instance as stored in Distributed Peer # N), and so on, without comparing hash values of each block of the entire first instance of the blockchain with hash values of each block of the entirety of the second instance and/or the third instance (and so on). In this example, such comparison (as denoted in FIG. 2 by reference numerals 225a and 225b) might reveal that the second sample segment (in this example, "eac45db2") does not match the corresponding hash value portions of either of the second instance (in this example, "ea7249bc") or the third instance (in this example, "ea7249bc," which is the same as that for the second instance in this case). It can thus be inferred that at least Block 2 210b has a relatively high probability of being invalid or changed compared with Block 2 205b of the second instance and/or Block 2 215b of the third instance.

Alternatively, or additionally, the computing system might parse the first instance to produce a third sample segment (in this example, the entire hash value of a block, "000013a99d7c475b . . . ") of a second hash value (in this case, "000013a99d7c475b . . . ," which is the same as the third sample segment) of a third block (which is actually Block 3 210c in this particular instance, although it could be Block 1 210a or Block 2 210b). The computing system might then compare the third sample segment with a corresponding hash value portion of the second instance (e.g., the instance as stored in Distributed Peer #1) and/or the third instance (e.g., the instance as stored in Distributed Peer # N), and so on, without comparing hash values of each block of the entire first instance of the blockchain with hash values of each block of the entirety of the second instance and/or the third instance (and so on). In this example, such comparison (as denoted in FIG. 2 by reference numerals 230a and 230b) might reveal that the third sample segment (in this example, "000013a99d7c475b . . . ") does not match the corresponding hash value portions of either of the second instance (in this example, "0000ed2793cf97a1 . . . ") or the third instance (in this example, "0000ed2793cf97a1 . . . ," which is the same as that for the second instance in this case). It can thus be inferred that at least Block 3 210c has a relatively high probability of being invalid or changed compared with Block 3 205c of the second instance and/or Block 3 215c of the third instance.

Figure 3:
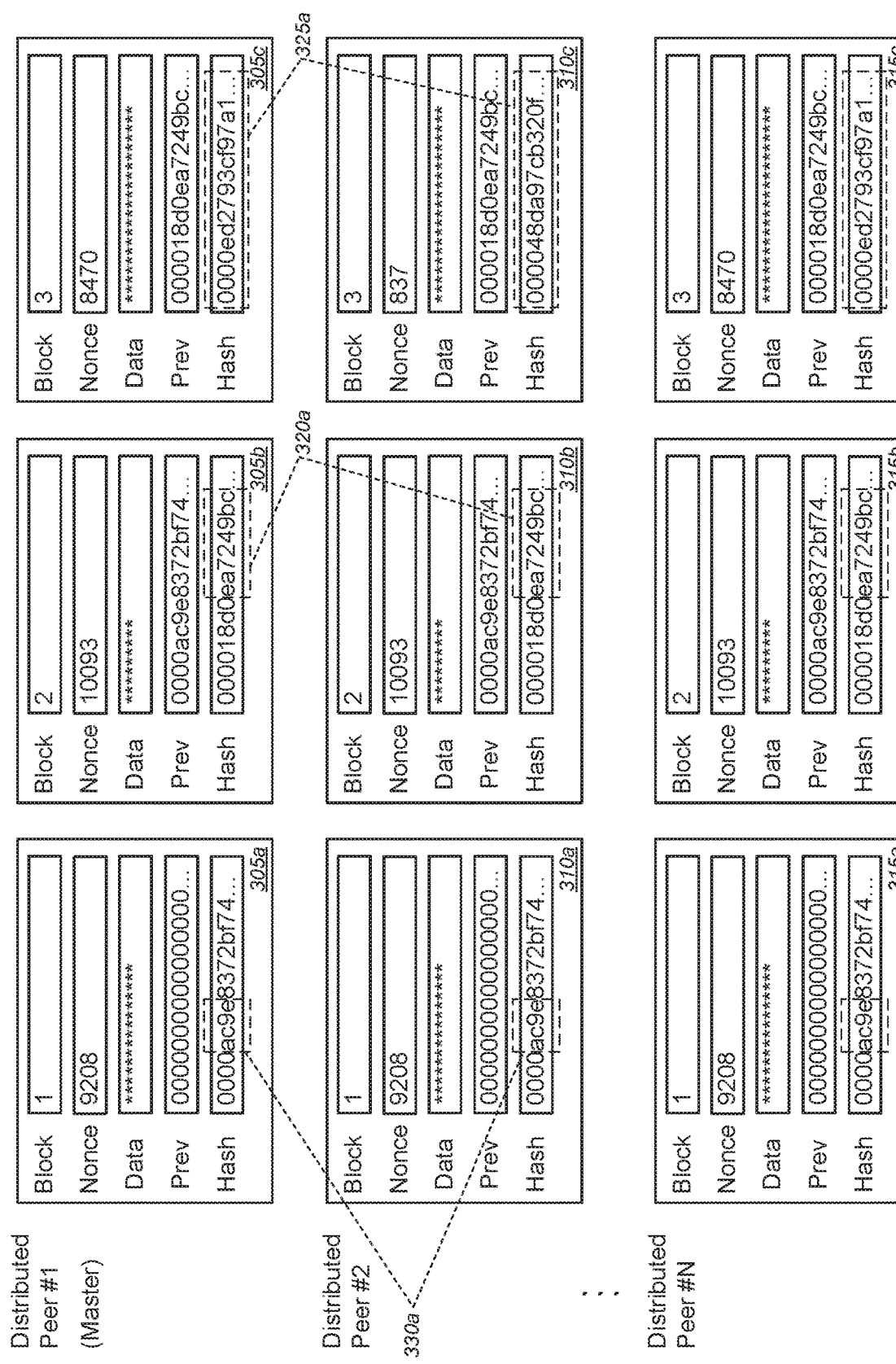
FIG. 3 is a schematic diagram illustrating another embodiment of a plurality of distributed peer data storage systems having instances of blockchains that may be verified without ledger limitations.

FIG. 3 is a schematic diagram illustrating another embodiment 300 of a plurality of distributed peer data storage systems having instances of blockchains that may be verified without ledger limitations. In some embodiments, there might exist at least one master instance of the blockchain, each of which (as described above) might be an instance that has previously been verified in its entirety to be valid and to accurately reflect fidelity of its data contents (either because it is stored in a peer data storage system that has tracked and/or monitored additions of blocks since block #1 of the blockchain and/or because auditing the particular instance against a plurality of other instances has verified to a high probability that it is valid and accurately reflects fidelity of its data contents, or the like). In such embodiments, segments of the hash value of portions of a target instance of the blockchain might be compared with corresponding hash value portions of the master instance to determine validity or invalidity of the target instance of the blockchain, as illustrated in the non-limiting embodiment 300 of FIG. 3.

With reference to FIG. 3, the embodiment 300 (as in embodiment 200 of FIG. 2) might comprise a plurality of instances of a blockchain that may be stored in a plurality of distributed peers or distributed peer data storage systems (i.e., Distributed Peer #1, #2, through # N, or the like; similar to distributed peer data storage systems 110 of system 100 of FIG. 1, or the like). In embodiment 300 (as in embodiment 200 of FIG. 2), each instance of the blockchain might comprise 3 blocks (although the number of blocks is merely illustrative and not intended to limit the invention to a blockchain of only three blocks, and can be applicable to blockchains of any number of blocks, from dozens, to scores, to hundreds, to thousands, or more, etc.), each block comprising its block number (in this example, #1, #2, or #3, or the like), a nonce value (which is a value used to offset the hash value so that the first four characters of the hash value are each "0"), the data being encapsulated or stored in the particular block (with examples of such data provided below), the hash value of the preceding block (with block #1 have a previous hash value of "0000000000000000 . . . "; also referred to as the "previous hash value" or the like), and the hash value of the current block (which is a hash of the data encapsulated in the block and the previous hash value). As described above, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

In the non-limiting embodiment of FIG. 3, three instances of a blockchain are shown, the blockchain having 3 blocks (for purposes of providing simplicity of illustration, as described above), like embodiment 200 of FIG. 2. The instance of the blockchain that is stored in Distributed Peer #1 might comprise in Block #1 305a, data of a first length (containing any suitable combination of characters, numbers, symbols, and/or the like; the types of data that may be stored or encapsulated in a block of a blockchain being listed below), a previous hash value equivalent to zero (as block #1 is the start of the blockchain and there is no preceding block in the blockchain, and thus no hash value for the non-existent previous block), and a hash value (which corresponds to a hash value of the data encapsulated in Block #1 and the previous hash value equivalent to zero). Also comprised in Block #1 might be a nonce value, which (as described above) is an offset value that is applied to the hash value to make the hash value begin with four zeros (i.e., "0000") which is the format for denoting a hash value for each signed block in a validated blockchain. Block #2 305b might likewise comprise data of a second length (also containing any suitable combination of characters, numbers, symbols, and/or the like; the types of data that may be stored or encapsulated in a block of a blockchain being listed below), a previous hash value equivalent to the hash value of Block #1, a hash value (which corresponds to a hash value of the data encapsulated in Block #2 and the previous hash value equivalent to the hash value of Block #1), and a nonce value. Similarly, Block #3 305c might comprise data of a third length (also containing any suitable combination of characters, numbers, symbols, and/or the like; the types of data that may be stored or encapsulated in a block of a blockchain being listed below), a previous hash value equivalent to the hash value of Block #2, a hash value (which corresponds to a hash value of the data encapsulated in Block #3 and the previous hash value equivalent to the hash value of Block #2), and a nonce value. The instances of the blockchain that are stored in Distributed Peer #2 and # N might have similar structure or format.

For purposes of illustration, the instances of the blockchain as stored in Distributed Peer #1 and # N might be identical, while a change (whether addition, deletion, or modification of at least one character in the data field of Block 3 310c of the instance) of the blockchain as stored in Distributed Peer #2 might be made, which would result in the hash value of Block 3 310c being automatically (and inherently) changed, requiring a different nonce value (in this example, "837") compared with the nonce value (in this example, "8470") of Block 3 305c or 315c of the instances of the blockchain as stored in Distributed Peer #1 and # N, in order to validate Block 3 310c (by mining or the like).

Taking the instance of the blockchain as stored in Distributed Peer #2 as the first instance (or target instance) and assuming that the instance of the blockchain as stored in Distributed Peer #1 is a master instance, a computing system might parse the first instance to produce a first sample segment (in this example, "ea7249bc") of a first hash value (in this case, "000018d0ea7249bc . . . ") of a first block (which is actually Block 2 310b in this particular instance, although it could be Block 1 310a or Block 3 310c). The computing system might then compare the first sample segment with a corresponding hash value portion of the master instance (e.g., the instance as stored in Distributed Peer #1), without comparing hash values of each block of the entire first instance of the blockchain with hash values of each block of the entire master instance of the blockchain. In this example, such comparison (as denoted in FIG. 3 by reference numerals 320a) might reveal that the first sample segment (in this example, "ea7249bc") matches the corresponding hash value portion of the master instance (in this example, "ea7249bc"). It can thus be inferred that at least Block 2 310b has a relatively high probability of being valid or unchanged compared with Block 2 305b of the master instance.

Alternatively, or additionally, the computing system might parse the first instance to produce a second sample segment (in this example, the entire hash value of a block, "000048da97cb320f . . . ") of a second hash value (in this case, "000048da97cb320f . . . ," which is the same as the second sample segment) of a second block (which is actually Block 3 310c in this particular instance, although it could be Block 1 310a or Block 2 310b). The computing system might then compare the second sample segment with a corresponding hash value portion of the master instance (e.g., the instance as stored in Distributed Peer #1), without comparing hash values of each block of the entire first instance of the blockchain with hash values of each block of the entire master instance of the blockchain. In this example, such comparison (as denoted in FIG. 3 by reference numerals 325a) might reveal that the second sample segment (in this example, "000048da97cb320f . . . ") does not match the corresponding hash value portions of either of the master instance (in this example, "0000ed2793cf97a1 . . . "). It can thus be inferred that at least Block 3 310c has a relatively high probability of being invalid or changed compared with Block 3 305c of the master instance.

Alternatively, or additionally, the computing system might parse the first instance to produce a third sample segment (in this example, "ac9e") of a third hash value (in this case, "0000ac9e8372bf74 . . . ") of a third block (which is actually Block 1 310a in this particular instance; although it could be Block 2 310b or Block 3 310c). The computing system might then compare the third sample segment with a corresponding hash value portion of a master instance (e.g., the instance as stored in Distributed Peer #1), without comparing hash values of each block of the entire first instance of the blockchain with hash values of each block of the entire master instance of the blockchain. In this example, such comparison (as denoted in FIG. 3 by reference numerals 320a and 320b) might reveal that the third sample segment matches the corresponding hash value portions of the master instance (namely, "ac9e"). It can thus be inferred that at least Block 1 310a has a relatively high probability of not being invalid or changed compared with Block 1 305a of the master instance.

FIGS. 4A-4D (collectively, "FIG. 4") are flow diagrams illustrating a method 400 for implementing scaling and distribution of blockchains without ledger limitations, in accordance with various embodiments. Method 400 of FIG. 4A continues onto FIG. 4C following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or embodiments 100, 200, and 300 of FIGS. 1, 2, and 3, respectively (or components thereof), such methods may also be implemented using any suitable hardware (or software) implementation. Similarly, while each of the systems or embodiments 100, 200, and 300 of FIGS. 1, 2, and 3, respectively (or components thereof), can operate according to the method 400 illustrated by FIG. 4 (e.g., by executing instructions embodied on a computer readable medium), the systems or embodiments 100, 200, and 300 of FIGS. 1, 2, and 3 can each also operate according to other modes of operation and/or perform other suitable procedures.

Figure 4A:
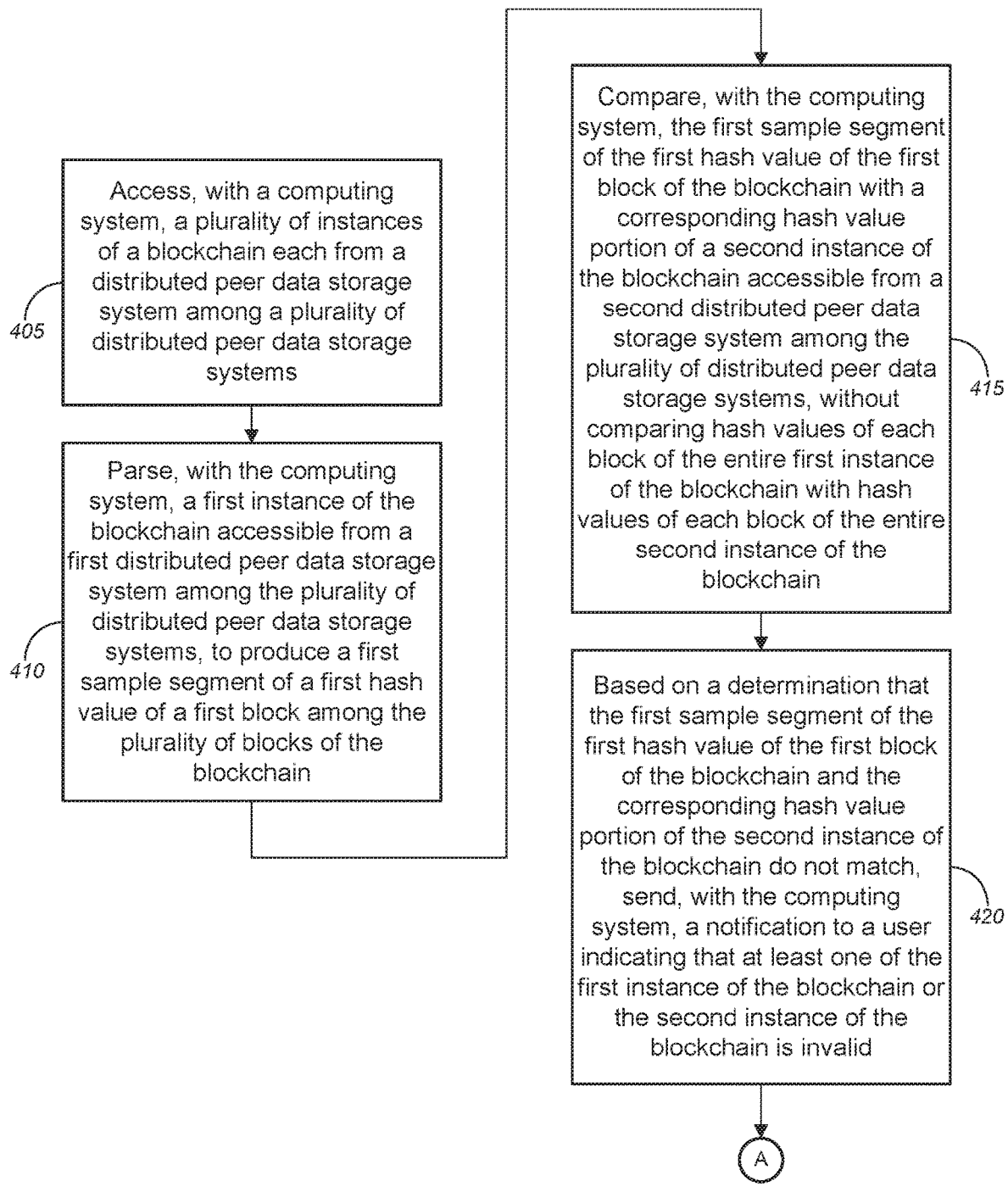

In the non-limiting embodiment of FIG. 4A, method 400, at block 405, might comprise accessing, with a computing system, a plurality of instances of a blockchain each from a distributed peer data storage system among a plurality of distributed peer data storage systems. The blockchain might comprise a plurality of blocks, each block comprising a hash value corresponding to encryption of both data that is encapsulated in said block and a previous hash value corresponding to encryption of data and hash value of a preceding block in the blockchain.

At block 410, method 400 might comprise parsing, with the computing system, a first instance of the blockchain accessible from a first distributed peer data storage system among the plurality of distributed peer data storage systems, to produce a first sample segment of a first hash value of a first block among the plurality of blocks of the blockchain. Method 400 might further comprise comparing, with the computing system, the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain (block 415). Method 400 might further comprise, at block 420, based on a determination that the first sample segment of the first hash value of the first block of the blockchain and the corresponding hash value portion of the second instance of the blockchain do not match, sending, with the computing system, a notification to a user indicating that at least one of the first instance of the blockchain or the second instance of the blockchain is invalid.

Figure 4B:
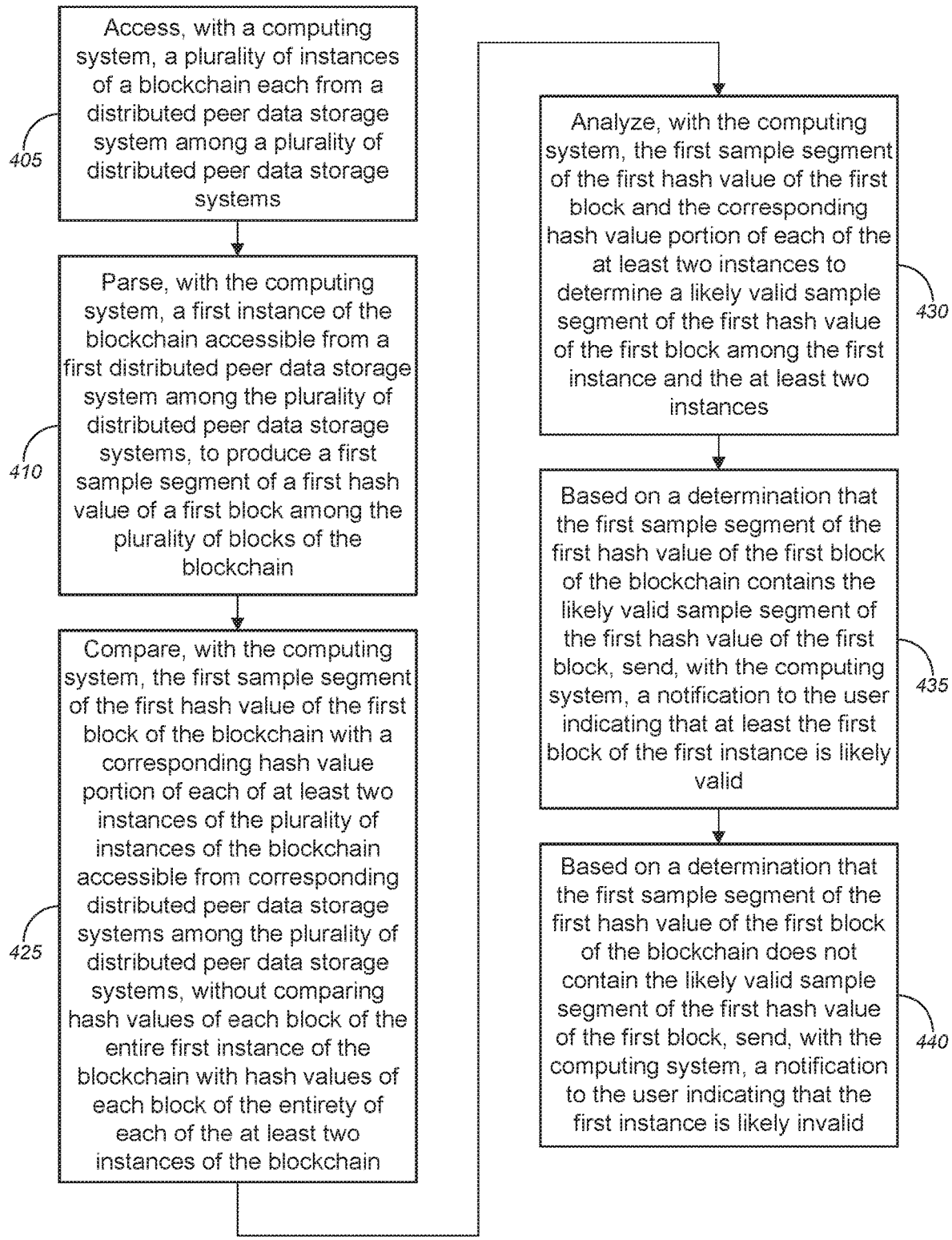

With reference to FIG. 4B, method 400, at block 405, might comprise accessing, with a computing system, a plurality of instances of a blockchain each from a distributed peer data storage system among a plurality of distributed peer data storage systems. The blockchain might comprise a plurality of blocks, each block comprising a hash value corresponding to encryption of both data that is encapsulated in said block and a previous hash value corresponding to encryption of data and hash value of a preceding block in the blockchain. At block 410, method 400 might comprise parsing, with the computing system, a first instance of the blockchain accessible from a first distributed peer data storage system among the plurality of distributed peer data storage systems, to produce a first sample segment of a first hash value of a first block among the plurality of blocks of the blockchain.

Method 400 might further comprise comparing, with the computing system, the first sample segment of the first hash value of the first block of the blockchain with a corresponding hash value portion of each of at least two instances of the plurality of instances of the blockchain accessible from corresponding distributed peer data storage systems among the plurality of distributed peer data storage systems, without comparing hash values of each block of the entire first instance of the blockchain with hash values of each block of the entirety of each of the at least two instances of the blockchain (block 425). Method 400 might further comprise, at block 430, analyzing, with the computing system, the first sample segment of the first hash value of the first block and the corresponding hash value portion of each of the at least two instances to determine a likely valid sample segment of the first hash value of the first block among the first instance and the at least two instances. Method 400 might further comprise, based on a determination that the first sample segment of the first hash value of the first block of the blockchain contains the likely valid sample segment of the first hash value of the first block, sending, with the computing system, a notification to the user indicating that at least the first block of the first instance is likely valid (i.e., beyond a predetermined threshold probability value that the first instance of the blockchain is valid) (block 435). Alternatively, method 400 might further comprise, based on a determination that the first sample segment of the first hash value of the first block of the blockchain does not contain the likely valid sample segment of the first hash value of the first block, sending, with the computing system, a notification to the user indicating that the first instance is likely invalid (i.e., beyond a predetermined threshold probability value that the first instance of the blockchain is invalid) (block 440).

In FIG. 4C, following the circular marker denoted, "A," from FIG. 4A, method 400 might further comprise, at block 445, parsing, with the computing system, the first instance of the blockchain, to produce a second sample segment of a second hash value of a second block among the plurality of blocks of the blockchain. According to some embodiments, at least one of the first sample segment of the first hash of the first block of the blockchain or the second sample segment of the second hash of the second block of the blockchain may be selected in a randomized manner (i.e., either actually random or pseudo-random (or near-random) based on randomizing algorithms, or the like). At block 450, method 400 might comprise comparing, with the computing system, the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain. Method 400 might further comprise, based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, sending, with the computing system, a notification to the user indicating that at least the first block and the second block of the first instance are likely valid (i.e., beyond a predetermined threshold probability value that the first instance of the blockchain is valid) (block 455). Alternatively, method 400 might further comprise, based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, sending, with the computing system, a notification to the user indicating that at least one of the first instance of the blockchain, the second instance of the blockchain, and the third instance of the blockchain is likely invalid (i.e., beyond a predetermined threshold probability value that the at least one of the first instance of the blockchain, the second instance of the blockchain, and the third instance of the blockchain is invalid) (block 460).

Figure 4D:
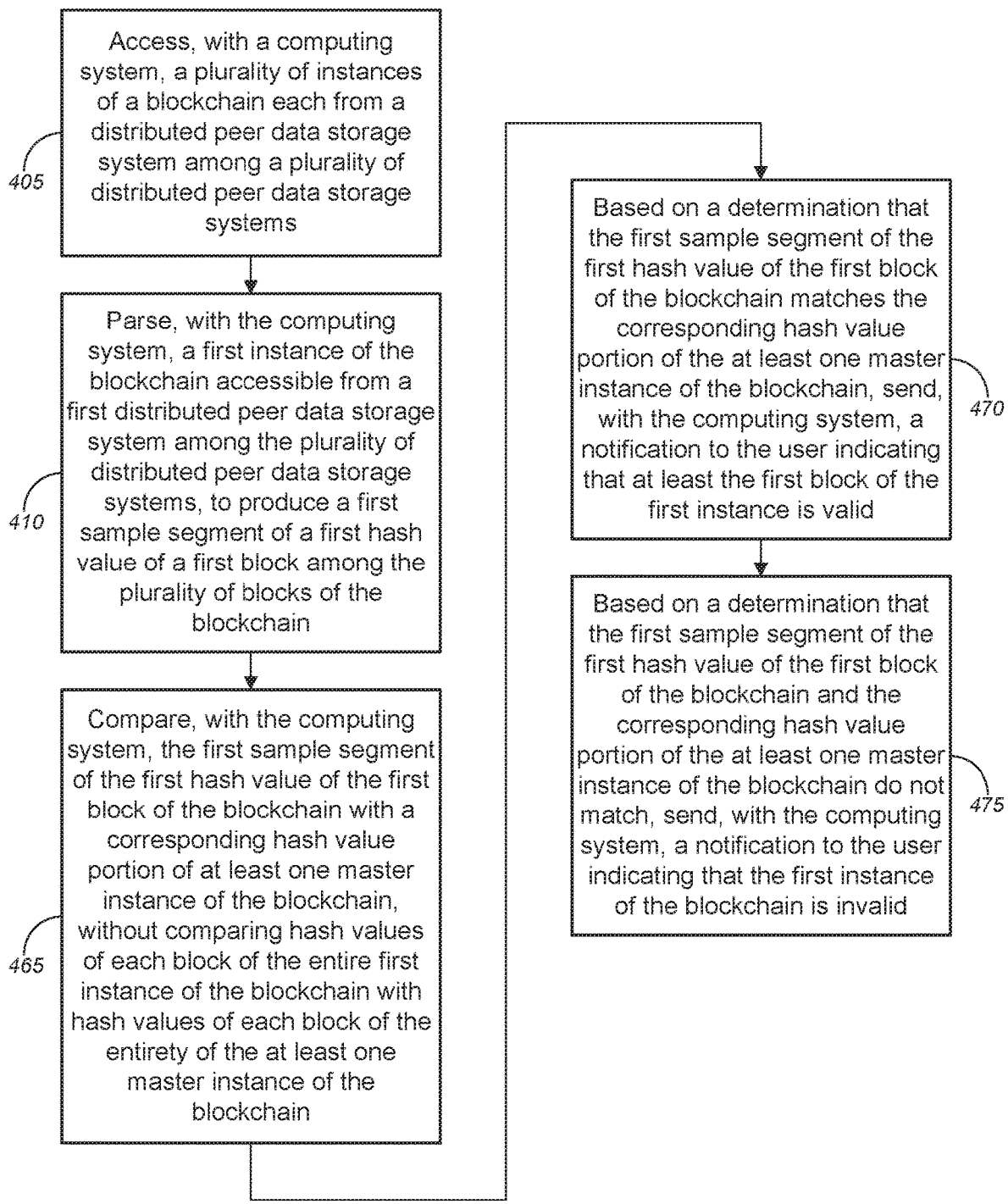

Turning to FIG. 4D, method 400, at block 405, might comprise accessing, with a computing system, a plurality of instances of a blockchain each from a distributed peer data storage system among a plurality of distributed peer data storage systems. The blockchain might comprise a plurality of blocks, each block comprising a hash value corresponding to encryption of both data that is encapsulated in said block and a previous hash value corresponding to encryption of data and hash value of a preceding block in the blockchain. At block 410, method 400 might comprise parsing, with the computing system, a first instance of the blockchain accessible from a first distributed peer data storage system among the plurality of distributed peer data storage systems, to produce a first sample segment of a first hash value of a first block among the plurality of blocks of the blockchain. In some embodiments, the plurality of instances of the blockchain might comprise at least one master instance of the blockchain each accessible from one of the plurality of distributed peer data storage systems.

Method 400 might further comprise comparing, with the computing system, the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain (block 465). Method 400 might further comprise, based on a determination that the first sample segment of the first hash value of the first block of the blockchain matches the corresponding hash value portion of the at least one master instance of the blockchain, sending, with the computing system, a notification to the user indicating that at least the first block of the first instance is valid (block 470). Alternatively, method 400 might further comprise, based on a determination that the first sample segment of the first hash value of the first block of the blockchain and the corresponding hash value portion of the at least one master instance of the blockchain do not match, sending, with the computing system, a notification to the user indicating that the first instance of the blockchain is invalid (block 475).

Merely by way of example, in some cases, the first sample segment of the first hash value of the first block might comprise the entire segment of the first hash of the first block. In some instances, the first block among the plurality of blocks of the blockchain may be selected based on selection by the user for verification of data encapsulated in the first block. For example, the user might wish to verify a transaction, whose data might be stored in block #3 of a particular blockchain having 10 blocks, or the like, and thus the first block (in this case) might be block #3 of the particular blockchain.

In some embodiments, the first sample segment of the first hash value is selected for analysis using one or more statistical sampling techniques, including, but not limited to, one or more of simple random sampling technique, systematic sampling technique, stratified sampling technique, probability-proportional-to-size sampling technique, cluster sampling technique, quota sampling technique, minimax sampling technique, accidental sampling technique, voluntary sampling technique, line-intercept sampling technique, panel sampling technique, snowball sampling technique, or theoretical sampling technique, and/or the like.

According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

Exemplary System and Hardware Implementation

Figure 5:
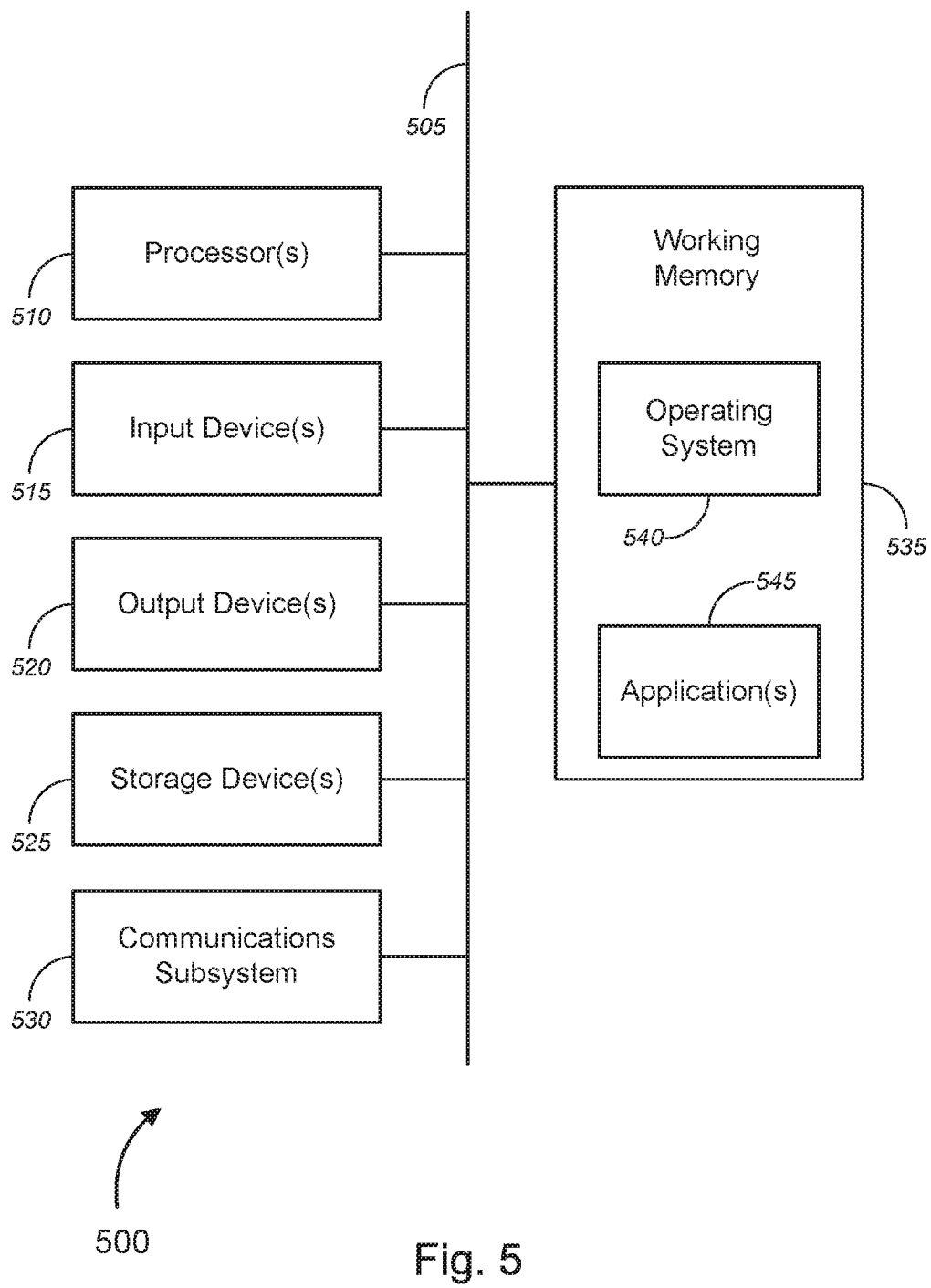
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, user devices 125a-125n and 130a-130n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, user devices 125a-125n and 130a-130n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
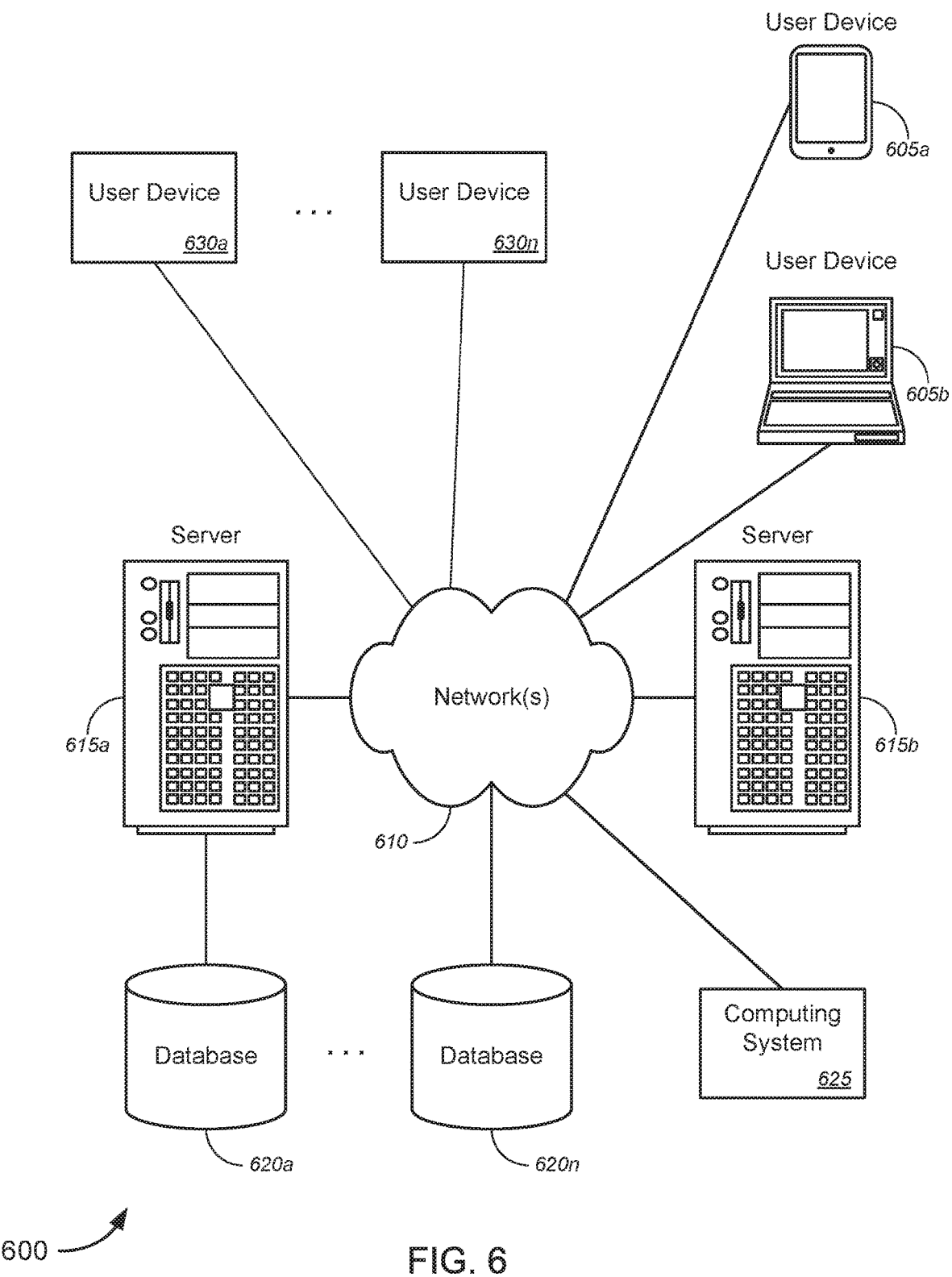
FIG. 6 is a block diagram illustrating a networked system of computers, computing systems, or system hardware architecture, which can be used in accordance with various embodiments.

As noted above, a set of embodiments comprises methods and systems for implementing blockchain transactions and/or verification, and, more particularly, to methods, systems, and apparatuses for implementing scaling and distribution of blockchains without ledger limitations. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 115a-115n, 120, and 135a-135n FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing blockchain transactions and/or verification, and, more particularly, to methods, systems, and apparatuses for implementing scaling and distribution of blockchains without ledger limitations, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 and one or more user devices 630a-630n. In some cases, the one or more user devices 605a, 605b, and 630a-630n might each include, without limitation, one of a laptop computer, a tablet computer, a smart phone, a mobile phone, a personal digital assistant, or a portable gaming device, or the like.

In operation, computing system 625 might access the plurality of instances of the blockchain each from a distributed peer data storage system among the plurality of distributed peer data storage systems (e.g., database 620a-620n, or the like), in some cases via server 615a or 615b and network(s) 610, or the like. The computing system 625 might parse a first instance of the blockchain accessible from a first distributed peer data storage system (i.e., one of database 620a-620n, or the like) among the plurality of distributed peer data storage systems, to produce a first sample segment of a first hash value of a first block among the plurality of blocks of the blockchain. The computing system 625 might compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain. Based on a determination that the first sample segment of the first hash value of the first block of the blockchain and the corresponding hash value portion of the second instance of the blockchain do not match, the computing system 625 might send a notification to a user (via a user device, such as one or more of user devices 605a, 605b, and 630a-630n, or the like) indicating that at least one of the first instance of the blockchain or the second instance of the blockchain is invalid.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   accessing, with a computing system, a plurality of instances of a blockchain each from a distributed peer data storage system among a plurality of distributed peer data storage systems, the blockchain comprising a plurality of blocks, each block comprising a hash value corresponding to encryption of both data that is encapsulated in said block and a previous hash value corresponding to encryption of data and hash value of a preceding block in the blockchain, wherein the hash value corresponding to each block comprises a set of at least one of numbers, letters, characters, or symbols identifying each block;
   parsing, with the computing system, a first instance of the blockchain accessible from a first distributed peer data storage system among the plurality of distributed peer data storage systems, to produce a first sample segment of a first hash value of a first block among the plurality of blocks of the blockchain, wherein the first hash value comprises a first set of the at least one of numbers, letters, characters, or symbols identifying the first block;
   producing, with the computing system, the first sample segment of the first hash value, wherein the first sample segment is a portion of the at least one of numbers, letters, characters, or symbols of the first set;
   comparing, with the computing system, the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain; and
   based on a determination that the first sample segment of the first hash value of the first block of the blockchain and the corresponding hash value portion of the second instance of the blockchain do not match, sending, with the computing system, a notification to a user indicating that at least one of the first instance of the blockchain or the second instance of the blockchain is invalid.

2. The method of claim 1, wherein:
   comparing the first sample segment of the first hash value of the first block of the blockchain with a corresponding hash value portion of a second instance of the blockchain comprises comparing, with the computing system, the first sample segment of the first hash value of the first block of the blockchain with a corresponding hash value portion of each of at least two instances of the plurality of instances of the blockchain accessible from corresponding distributed peer data storage systems among the plurality of distributed peer data storage systems, without comparing hash values of each block of the entire first instance of the blockchain with hash values of each block of the entirety of each of the at least two instances of the blockchain;
   the method further comprises:
      analyzing, with the computing system, the first sample segment of the first hash value of the first block and the corresponding hash value portion of each of the at least two instances to determine a valid sample segment of the first hash value of the first block among the first instance and the at least two instances;
      based on a determination that the first sample segment of the first hash value of the first block of the blockchain contains the valid sample segment of the first hash value of the first block, sending, with the computing system, a notification to the user indicating that at least the first block of the first instance is valid; and
      based on a determination that the first sample segment of the first hash value of the first block of the blockchain does not contain the valid sample segment of the first hash value of the first block, sending, with the computing system, a notification to the user indicating that the first instance is invalid.

3. The method of claim 1, further comprising:
   parsing, with the computing system, the first instance of the blockchain, to produce a second sample segment of a second hash value of a second block among the plurality of blocks of the blockchain;
   comparing, with the computing system, the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain;
   based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, sending, with the computing system, a notification to the user indicating that at least the first block and the second block of the first instance are valid; and
   based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, sending, with the computing system, a notification to the user indicating that at least one of the first instance of the blockchain, the second instance of the blockchain, and the third instance of the blockchain is invalid.

4. The method of claim 3, wherein at least one of the first sample segment of the first hash of the first block of the blockchain or the second sample segment of the second hash of the second block of the blockchain is selected in a randomized manner.

5. The method of claim 1, wherein:
the plurality of instances of the blockchain comprises at least one master instance of the blockchain each accessible from one of the plurality of distributed peer data storage systems;
comparing the first sample segment of the first hash value of the first block of the blockchain with a corresponding hash value portion of a second instance of the blockchain comprises comparing, with the computing system, the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain; and
the method further comprises:
based on a determination that the first sample segment of the first hash value of the first block of the blockchain matches the corresponding hash value portion of the at least one master instance of the blockchain, sending, with the computing system, a notification to the user indicating that at least the first block of the first instance is valid; and
based on a determination that the first sample segment of the first hash value of the first block of the blockchain and the corresponding hash value portion of the at least one master instance of the blockchain do not match, sending, with the computing system, a notification to the user indicating that the first instance of the blockchain is invalid.

6. The method of claim 1, wherein the first block among the plurality of blocks of the blockchain is selected based on selection by the user for verification of data encapsulated in the first block.

7. The method of claim 1, wherein the first sample segment of the first hash value is selected for analysis using one or more statistical sampling techniques.

8. The method of claim 1, wherein data of a block and hash value of a previous block in the blockchain are encrypted to produce a hash value, using a cryptographic hash function comprising one of secure hash algorithm-1 ("SHA-1") standard, SHA-2 standard, or SHA-3 standard.

9. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
access a plurality of instances of a blockchain each from a distributed peer data storage system among a plurality of distributed peer data storage systems, the blockchain comprising a plurality of blocks, each block comprising a hash value corresponding to encryption of both data that is encapsulated in said block and a previous hash value corresponding to encryption of data and hash value of a preceding block in the blockchain, wherein the hash value corresponding to each block comprises a set of at least one of numbers, letters, characters, or symbols identifying each block;
parse a first instance of the blockchain accessible from a first distributed peer data storage system among the plurality of distributed peer data storage systems, to produce a first sample segment of a first hash value of a first block among the plurality of blocks of the blockchain, wherein the first hash value comprises a first set of the at least one of numbers, letters, characters, or symbols identifying the first block;
produce the first sample segment of the first hash value, wherein the first sample segment is a portion of the at least one of numbers, letters, characters, or symbols of the first set;
compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain; and
based on a determination that the first sample segment of the first hash value of the first block of the blockchain and the corresponding hash value portion of the second instance of the blockchain do not match, send a notification to a user indicating that at least one of the first instance of the blockchain or the second instance of the blockchain is invalid.

10. The apparatus of claim 9, wherein:
comparing the first sample segment of the first hash value of the first block of the blockchain with a corresponding hash value portion of a second instance of the blockchain comprises comparing the first sample segment of the first hash value of the first block of the blockchain with a corresponding hash value portion of each of at least two instances of the plurality of instances of the blockchain accessible from corresponding distributed peer data storage systems among the plurality of distributed peer data storage systems, without comparing hash values of each block of the entire first instance of the blockchain with hash values of each block of the entirety of each of the at least two instances of the blockchain;
the set of instructions, when executed by the at least one processor, further causes the apparatus to:
analyze the first sample segment of the first hash value of the first block and the corresponding hash value portion of each of the at least two instances to determine a valid sample segment of the first hash value of the first block among the first instance and the at least two instances;
based on a determination that the first sample segment of the first hash value of the first block of the blockchain contains the valid sample segment of the first hash value of the first block, send a notification to the user indicating that at least the first block of the first instance is valid; and based on a determination that the first sample segment of the first hash value of the first block of the blockchain does not contain the valid sample segment of the first hash value of the first block, send a notification to the user indicating that the first instance is invalid.

11. The apparatus of claim 9, wherein the set of instructions, when executed by the at least one processor, further causes the apparatus to:

parse the first instance of the blockchain to produce a second sample segment of a second hash value of a second block among the plurality of blocks of the blockchain;

compare the second sample segment of the second hash value of the second block of the blockchain with a corresponding hash value portion of a third instance of the blockchain accessible from a third distributed peer data storage system among the plurality of distributed peer data storage systems, without comparing hash values of each block of the entire first instance of the blockchain with hash values of each block of the entire third instance of the blockchain;

based on a determination that the first sample segment of the first hash value of the first block of the blockchain matches the corresponding hash value portion of the second instance of the blockchain, and based on a determination that the second sample segment of the second hash value of the second block of the blockchain matches the corresponding hash value portion of the third instance of the blockchain, send a notification to the user indicating that at least the first block and the second block of the first instance are valid; and based on at least one of a determination that the first sample segment of the first hash value of the first block of the blockchain and the corresponding hash value portion of the second instance of the blockchain do not match or a determination that the second sample segment of the second hash value of the second block of the blockchain and the corresponding hash value portion of the third instance of the blockchain do not match, send a notification to the user indicating that at least one of the first instance of the blockchain, the second instance of the blockchain, and the third instance of the blockchain is invalid.

12. The apparatus of claim 11, wherein at least one of the first sample segment of the first hash of the first block of the blockchain or the second sample segment of the second hash of the second block of the blockchain is selected in a randomized manner.

13. The apparatus of claim 9, wherein:

the plurality of instances of the blockchain comprises at least one master instance of the blockchain each accessible from one of the plurality of distributed peer data storage systems;

comparing the first sample segment of the first hash value of the first block of the blockchain with a corresponding hash value portion of a second instance of the blockchain comprises comparing the first sample segment of the first hash value of the first block of the blockchain with a corresponding hash value portion of the at least one master instance of the blockchain, without comparing hash values of each block of the entire first instance of the blockchain with hash values of each block of the entirety of the at least one master instance of the blockchain; and the set of instructions, when executed by the at least one processor, further causes the apparatus to:

based on a determination that the first sample segment of the first hash value of the first block of the blockchain matches the corresponding hash value portion of the at least one master instance of the blockchain, send a notification to the user indicating that at least the first block of the first instance is valid; and based on a determination that the first sample segment of the first hash value of the first block of the blockchain and the corresponding hash value portion of the at least one master instance of the blockchain do not match, send a notification to the user indicating that the first instance of the blockchain is invalid.

14. The apparatus of claim 9, wherein the first block among the plurality of blocks of the blockchain is selected based on selection by the user for verification of data encapsulated in the first block.

15. The apparatus of claim 9, wherein the first sample segment of the first hash value is selected for analysis using one or more statistical sampling techniques.

16. A system, comprising:

a plurality of distributed peer data storage systems, each distributed peer data storage system storing an instance of a blockchain among a plurality of instances of the blockchain, the blockchain comprising a plurality of blocks, each block comprising a hash value corresponding to encryption of both data that is encapsulated in said block and a previous hash value corresponding to encryption of data and hash value of a preceding block in the blockchain, wherein the hash value corresponding to each block comprises a set of at least one of numbers, letters, characters, or symbols identifying each block;

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

access the plurality of instances of the blockchain each from a distributed peer data storage system among the plurality of distributed peer data storage systems;

parse a first instance of the blockchain accessible from a first distributed peer data storage system among the plurality of distributed peer data storage systems, to produce a first sample segment of a first hash value of a first block among the plurality of blocks of the blockchain, wherein the first hash value comprises a first set of the at least one of numbers, letters, characters, or symbols identifying the first block;

produce the first sample segment of the first hash value, wherein the first sample segment is a portion of the at least one of numbers, letters, characters, or symbols of the first set;

compare the first sample segment of the first hash value of the first block of the blockchain with a corresponding hash value portion of a second instance of the blockchain accessible from a second distributed peer data storage system among the plurality of distributed peer data storage systems, without comparing hash values of each block of the entire first instance of the blockchain with hash values of each block of the entire second instance of the blockchain; and based on a determination that the first sample segment of the first hash value of the first block of the blockchain and the corresponding hash value portion of the second instance of the blockchain do not match, send a notification to a user device associated with a user indicating that at least one of the first instance of the blockchain or the second instance of the blockchain is invalid; and the user device associated with the user, comprising:
a display device;
at least one second processor; and
a second non-transitory computer readable medium communicatively coupled to the at least one second processor, the second non-transitory computer readable medium having stored thereon computer software comprising a second set of instructions that, when executed by the at least one second processor, causes the user device to:
receive the notification indicating that the at least one of the first instance of the blockchain or the second instance of the blockchain is invalid; and
display, on the display device, the received notification.

17. The system of claim 16, wherein the user device comprises one of a laptop computer, a tablet computer, a smart phone, a mobile phone, a personal digital assistant, or a portable gaming device.

\* \* \* \* \*